(12) United States Patent
Izumi

(10) Patent No.: US 7,835,071 B2
(45) Date of Patent: Nov. 16, 2010

(54) FAR-INFRARED CAMERA LENS, LENS UNIT, AND IMAGING APPARATUS

(75) Inventor: Tatsuya Izumi, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 346 days.

(21) Appl. No.: 12/076,335

(22) Filed: Mar. 17, 2008

(65) Prior Publication Data

US 2009/0067040 A1    Mar. 12, 2009

(30) Foreign Application Priority Data

Sep. 10, 2007   (JP)  ............................. 2007-233493

(51) Int. Cl.
*G02B 13/14* (2006.01)
(52) U.S. Cl. ...................... 359/356; 359/789
(58) Field of Classification Search .................. 359/355, 359/356, 784, 785, 789
See application file for complete search history.

(56) References Cited

U.S. PATENT DOCUMENTS

| | | | | |
|---|---|---|---|---|
| 5,973,827 A * | 10/1999 | Chipper | ...................... | 359/356 |
| 6,507,432 B1 * | 1/2003 | Watanabe | ................... | 359/356 |
| 6,999,243 B2 * | 2/2006 | Chipper | ...................... | 359/690 |
| 7,184,225 B1 * | 2/2007 | Noda | ......................... | 359/784 |
| 7,212,354 B2 * | 5/2007 | Sun | .............................. | 359/784 |
| 7,362,518 B2 * | 4/2008 | Sun | .............................. | 359/753 |
| 7,394,602 B2 * | 7/2008 | Chen et al. | .................. | 359/785 |
| 7,468,847 B2 * | 12/2008 | Tang | ......................... | 359/785 |
| 7,477,461 B2 * | 1/2009 | Bareau et al. | ............... | 359/785 |
| 7,515,358 B2 * | 4/2009 | Noda | ......................... | 359/785 |
| 2003/0169491 A1 * | 9/2003 | Bender et al. | ............... | 359/356 |

FOREIGN PATENT DOCUMENTS

| | | |
|---|---|---|
| EP | 1 980 888 A1 | 10/2008 |
| EP | 1 990 666 A1 | 11/2008 |
| JP | 04 230717 A | 8/1992 |
| JP | 11-295501 A | 10/1999 |
| JP | 2003-295052 A | 10/2003 |
| JP | 2007-199573 A | 8/2007 |
| WO | WO 03/055826 A1 | 7/2003 |
| WO | WO-2007/086178 A1 | 8/2007 |
| WO | WO-2007/099836 A1 | 9/2007 |

* cited by examiner

*Primary Examiner*—Frank G Font
(74) *Attorney, Agent, or Firm*—Venable LLP; Michael A. Satori; Steven J. Schwarz

(57) ABSTRACT

A far-infrared camera includes three lenses formed of ZnS. A first lens is a biconvex lens, a second lens is a negative meniscus or biconcave lens, and a third lens is a positive meniscus lens. A diffraction surface is formed in either surface of a lens. When a total focal distance f of the lens system is 10 mm to 30 mm and a focal distance $f_{12}$ of the first and second lenses is 20 mm to 70 mm, $1 \leq f_{12}/f \leq 3$.

8 Claims, 13 Drawing Sheets

FAR-INFRARED CAMERA LENS, LENS UNIT, AND IMAGING APPARATUS

BACKGROUND OF THE INVENTION

The present invention relates to a far-infrared camera lens having a wide angle and a lens unit and an imaging apparatus using the same. A far-infrared ray is light in a wavelength range of 8 µm to 12 µm, which includes a wavelength range of far-infrared rays that human beings emit. The wavelength range of far-infrared rays is much longer than a wavelength range for optical communication. A far-infrared camera is a camera that can sense an infrared ray, which is emitted from a human being or an animal, and can image the human being or the animal at night. In order to make it safer to drive an automobile at night, it is desirable to quickly and accurately recognize a human being or an animal that is present ahead.

An automobile illuminates a front side with a head lamp so as to recognize an image with reflected light. This is front recognition using visible reflected light. However, a distant place or a side where light emitted from a lamp does not reach is not visible in case of the method using visible reflected light. This is complemented by a far-infrared camera.

The body temperature of a human being or an animal is about 310 K, and a peak wavelength of black-body radiation at 310 K is about 8 µm to 12 µm. Accordingly, existence of a human being can be recognized by catching a far-infrared ray, which is emitted from a human being or an animal, using a far-infrared camera. A distant place other than a radiation range of a lamp can also be viewed because the far-infrared ray is not reflected light of the lamp. If an apparatus in which a far-infrared camera and an image processing system are combined is provided in an automobile, a human being or an animal that is present far away can be recognized early. Then, safety in driving an automobile at night will be improved.

It is preferable that a far-infrared camera for night observation be provided in an automobile. However, in order to make it possible, there are various difficulties to be solved. One of the difficulties is that the far-infrared camera is very expensive. In addition, another difficulty is that the resolution is not still sufficient. Thus, there is a problem that an optical system is defective. Furthermore, there is no light receiving elements which are cheap and suitable.

Since a far-infrared ray has low energy, it is not possible to detect the far-infrared ray by using a normal photodiode which uses a substrate, which is formed of Si, GaAs, InP, or the like having a wide band gap. Since the far-infrared ray has low energy, the ray can be received when PN junction is made with a semiconductor having a narrow band gap. However, since far-infrared energy is about a room temperature, the far-infrared ray cannot be detected when a light receiving element is at a room temperature. It is difficult to use the light receiving element for a vehicle if the light receiving element is not extremely cooled.

Therefore, for example, a thermopile detector, an SOI (silicon on insulator) diode, or a bolometer having sensitivity in a range of 8 to 12 µm is used as an imaging device of a far-infrared camera. Those described above are not light receiving elements having PN junction but elements which convert heat into electricity and non-cooled-type imaging devices. Currently, an imaging device having the number of pixels of 160×120 or 320×240 is used.

Here, discussion will be focused on an optical system. There is one problem in a lens material used to condense far-infrared rays. Germanium (Ge) is a material allowing an infrared ray to satisfactorily pass therethrough. Since germanium is a material allowing an infrared ray to satisfactorily pass therethrough and has a high refractive index (about 4 in the case of a far-infrared ray), germanium is an excellent infrared material. The transmittance of a far-infrared ray having a wavelength of 10 µm with respect to Ge is about 40 to 45%. However, in the case where antireflection coating is properly performed, the transmittance is about 90 to 98%.

However, Ge is a rare mineral the output of which is low. Ge is a limited natural resource and is very expensive. In addition, since Ge is extremely hard, it is necessary to make the form of the lens by cutting a large Ge lump and then make a surface smooth by grinding. This is a work that is performed over a long period of time using precise equipment. Since Ge is hard, a tool is also special. In the case when a Ge lens is used, a price is increased. It is difficult that an expensive far-infrared camera is widespread.

Chalcogenide glass is also known as a material of an infrared lens. Chalcogenide glass is glass containing chalcogen, such as chlorine, bromine, and iodine, and germanium. Since there is little absorption of infrared rays in the chalcogenide glass, the chalcogenide glass may be used for the infrared lens. Since the chalcogenide glass can be liquefied by heating, the chalcogenide glass can be molded in accordance with the shape of a mold. However, since the chalcogenide glass also contains germanium as a principal component, a material cost increases.

There is ZnSe as a material not containing Ge. ZnSe can be polycrystallized by using a CVD method, and then a lens can be obtained by scraping the polycrystallized ZnSe. In the same manner as Ge, it takes a manufacturing cost for cutting and grinding.

In order that a far-infrared camera is widely mounted in an automobile, it is necessary to manufacture the far-infrared camera at low cost. Therefore, it is necessary to develop a sensor capable of efficiently sensing far-infrared rays in a range of 8 µm to 12 µm and to manufacture a lens optical system at low cost. As described above, a best material for a far-infrared ray is germanium. However, germanium is an expensive material. Accordingly, as long as Ge is used, an inexpensive far-infrared camera cannot be made. Although the chalcogenide glass is also a next candidate, it is not possible to reduce the cost because the chalcogenide glass also contains a large amount of germanium. The ZnSe is also a candidate for infrared rays, but the ZeSe is not suitable as a camera lens because absorption of far-infrared rays is large.

Next, ZnS (zinc sulfide) is considered as a candidate. This is an inexpensive material. The far-infrared ray transmittance of ZnS is lower than that of germanium and far-infrared ray absorption of ZnS is larger than that of germanium. The transmittance at a wavelength of 10 µm is about 70 to 75%. In the case where antireflection coating is properly performed, the transmittance is about 85 to 90%. A refractive index of ZnS is lower than that of germanium. For this reason, ZnS is inferior to germanium in terms of properties as a lens. Moreover, it is also difficult to work with the ZnS. Currently, it may be possible to polycrystallize ZnS with a CVD method, to cut the polycrystalline ZnS in a cylindrical convex shape or a cylindrical concave shape, and to grind the polycrystalline ZnS so as to finally make a surface thereof smooth. However, since the ZnS is also a hard material, it takes cost to cut and grind the ZnS. For these reasons, there has been no infrared optical system realized by using a ZnS lens.

However, there are some proposals of far-infrared lenses using ZnS lenses. Patent Document 1 proposes a method of manufacturing a ZnS lens using a sintering process. In this case, ZnS powder is molded by hot compression using a lens-shaped mold.

Patent Document 2 proposes a method of manufacturing a lens as a polycrystalline ZnS sintered compact by molding ZnS by hot compression in a temperature range of 900° C. to 1000° C. and under the pressure of 150 to 800 kg/cm$^2$.

[Patent Document 1] WO2003/055826
[Patent Document 2] JP-A-11-295501

One of the useful applications of a far-infrared camera is a night vision system which helps an automobile driver to perceive a pedestrian. This is a night-time pedestrian detection system using a far-infrared camera. Since a human being or an animal has considerably high body temperature, the human being or the animal emits infrared rays in a wavelength range of 8 μm to 12 μm. Existence of a human being or an animal in the street can be detected at night by using a camera that senses an infrared ray in the above wavelength range. Since it is not detection of reflected light, it is possible to detect a human being or an animal present in a distant place or an inclined portion where light of a lamp does not reach. It is expected, in an automobile running at high speed, to detect the existence of a human being or an animal positioned at a corner of a field of view that cannot be sufficiently viewed by reflected light of a head lamp. Accordingly, it is preferable to have a wide angle. In addition, in order to distinguish between a human being and an object body, high resolution is requested. Moreover, in the case of a system for a vehicle, the system should be small since there is no sufficient space in the vehicle.

However, in the case of a lens which is small and has a wide angle, a back focus BF tends to be shortened. The back focus is a distance from a back surface of a last lens of a lens system to an image surface (image formed surface). In the case of an infrared sensor, a window and a sensor (light receiving surface) are separated from each other by several millimeters. Accordingly, if a back focus is shorter than a distance between the window and an image surface, the last lens comes in contact with the window. For example, the distance between the window and the sensor is about 4 mm to 5 mm. The window has a thickness of 0.5 mm to 1.0 mm, for example.

Furthermore, it is necessary to attach a shutter outside the window. The shutter is a thin metal plate that is instantaneously opened and closed and has a limited thickness. The shutter should not be in contact with the last lens or the window. Therefore, if the sufficient back focus BF is not secured, there is no sufficient room for combination with a sensor. A desirable range of the back focus is determined from the size of a sensor. In the case where the distance between the window and the sensor surface is 4 mm to 5 mm and the thickness of the window is 0.5 mm to 1.0 mm as described above, a back focus of 6 mm or more is requested.

SUMMARY OF THE INVENTION

The invention provides a method of realizing that described above. In the case of a camera for a vehicle, the overall size of the camera should not be too large. Accordingly, the back focus BF does not need to be so large. The back focus BF is preferably 20 mm at the maximum. Therefore, it is an object of the invention to set the back focus to 6 mm to 20 mm. It is a first object of the invention to provide an infrared lens which uses ZnS as a material and has a long back focus. It is a second object of the invention to provide an infrared lens which has a long back focus, high resolution, and a wide field of view.

A focal distance becomes short if a lens should be small and have a wide angle. For this reason, the back focus BF is generally short. Since a window and an image surface (sensor surface) are separated from each other within a sensor and a shutter is provided outside the window, an image of an object at infinity cannot be formed on the image surface of the sensor if a back focus is short. Therefore, it is an object of the invention to provide a far-infrared lens having a back focus of 6 mm or more.

An infrared lens of the invention is formed of ZnS and is configured to include a front group and a rear group. The front group includes a first lens having a biconvex shape and a second lens having a negative meniscus shape or a biconcave shape, and the rear group includes a third lens having a positive meniscus shape. A surface of each of the lenses is an aspheric surface. At least a surface is a diffraction surface. The aspheric surface and the diffraction surface are provided to suppress various kinds of aberrations. This is not directly related with the object of making the back focus BF long. A back focus can be made long by suitably selecting the shape and a focal distance of a lens.

In addition, a lens unit may be obtained by combination of those lenses. Moreover, an imaging apparatus (infrared camera) provided with the lens unit and an imaging unit, which images an image formed on the lenses, may also be obtained.

Since the invention is configured to include the first lens having a biconvex shape, a negative meniscus lens or the second lens having a biconcave shape, and the third lens having a positive meniscus shape, it is possible to realize the long back focus BF. The first lens increases the curvature of a convex surface on an object side because the first lens has a biconvex shape. This is done to obtain a wide angle. The curvature on an image surface side may be small. An image-surface-side surface may be almost flat. The first lens has a biconvex shape since an aberration, which cannot be corrected in the second lens, occurs, if the first lens has a positive meniscus shape. The second lens serves to spread beams. For this reason, the second lens needs to be concave on the image surface side. Even in the case of the negative meniscus lens, the lens needs to be a concave meniscus lens on the image surface side.

The first and second lenses cause an image to be formed farther than an image surface. The image is pulled back by the third lens, such that the image is formed on the image surface (sensor surface). Accordingly, the third lens is a lens having positive refractive power. In order to obtain a wide-angle lens, ambient light is spread by the second lens. Accordingly, the third lens is a positive lens which is convex on the object side.

The back focus BF is a distance between the last lens and the image surface as described above. In the invention, the back focus BF is a distance from a back surface of the third lens to the sensor image surface. It is preferable to make a distance up to an image of the third lens long in order to make the back focus long. The image is formed in a distance place by the second lens. Assuming that a distance from the third lens to the image is a, a focal distance of the third lens is $f_3$, and a distance from the third lens to the image surface is b, $1/(-a)+1/b=1/f_3$ ($f_3>0$; $a>b$). Here, b>6 mm is a goal.

Since b is set to be large, it is preferable that $f_3$ be considerably large. However, a distance (length of a total optical system including a camera and a sensor) from the first lens to the image surface is limited (25 mm to 40 mm). Accordingly, an upper limit of the total focal distance f is restricted. However, f should be large to some degree in order to increase b. Then, the total focal distance f is limited to about 10 mm to 30 mm. It is necessary to form an image at the infinity in a front place (distant place) from the image surface by means of the first and second lenses. $f_{12}$ needs to be 20 mm or more depending on the refractive power of the third lens and a distance between the second and third lenses.

However, since the refractive power of the third lens should be increased if an image is formed too far, the upper limit of $f_{12}$ is about 70 mm. Therefore, $f_{12}$ is set to about 20 mm to 70 mm. In addition to the focal distance of a lens, a distance between lenses is also related, which is complicated. The back focus BF can be set to 6 mm or more if the refractive power of a lens and the distance between lenses are properly selected in a condition of f=10 to 30 mm and $f_{12}$=20 to 70 mm.

When the back focus BF is made long, a lens on an image surface side becomes closer to a lens on an object side, such that off-axis light beams of the lens on the image surface side pass through a place distant from the optical axis. As a result, it becomes difficult to correct a spherical aberration and astigmatism. In the invention, a surface of a lens is used as an aspheric surface. Due to the aspheric surface, the spherical aberration and the astigmatism can be satisfactorily corrected.

In ZnS, wavelength dispersion is large. Accordingly, a chromatic aberration occurs in ZnS, which deteriorates the performance. In the invention, a diffraction surface is used to reduce the chromatic aberration. In addition, the diffraction surface also largely contributes to correction of a spherical aberration.

Moreover, in the case of a lens having a viewing angle of 20° to 30°, assuming that the focal distance f of the entire lens system is f and the focal distance of the front group (first lens G1 and second lens G2) is $f_{12}$, the ratio is set to be 1 to 3 in order to secure the optical performance.

That is, $1 \leq f_{12}/f \leq 3$

Here, f is a total focal distance, and $f_{12}$ is a focal distance of the first and second lenses (front group G1 and G2). By satisfying this condition, an aberration within a field of view is corrected with a good balance in the lens system of the invention. As a result, the configuration in which the back focus BF is long and which is bright and has a wide angle is easily realized. If the ratio is smaller than the lower limit '1', power of the first lens become too large. Accordingly, it becomes difficult to correct a spherical aberration. If the ratio is smaller than the upper limit '3', degrees of aspheric surfaces of the second and third lenses become too large. Accordingly, it becomes difficult to correct an aberration of a light beam having a large inclination angle. In addition, correction of a distortion aberration also becomes difficult.

The first to third lenses made of ZnS are formed by molding. Therefore, manufacturing cost can be reduced compared with a case where the lenses are manufactured by cutting.

Furthermore, in the invention, a ZnS lens is manufactured by molding ZnS raw powder by hot compression in a high temperature and high pressure condition using a lens-shaped mold. Accordingly, predetermined limitation is applied to the shape of a lens. In order to secure sufficient moldability (mechanical strength, machining precision) in a high temperature and high pressure condition, the lens thickness is preferably large to some degree. On the other hand, absorption is also increased if the thickness is too large, which is not preferable. Since absorption of ZnS is larger than Ge in a range of 8 to 12 μm, the thickness of a lens is preferably 8 mm or less. Although the thickness of a lens changes with the position because a lens surface is irregular, limitation of the thickness is expressed by using the central thickness and the thickness (this is called edge thickness) of a peripheral portion. Since a middle portion has a middle value, the thickness range can be thus expressed.

In the case of a high-resolution lens system targeted for an imaging device having a pixel pitch of 25 μm, for example, a ZnS lens of the invention satisfies the following conditions in consideration of moldability and transparency.

1.5 mm<central thickness<8.0 mm
1.0 mm<edge thickness<8.0 mm

In order to secure moldability (mechanical strength, machining precision) in molding under a high temperature and high pressure condition, the curvature of a lens is preferably small. The reciprocal of a radius of curvature R of a lens is a curvature. In the case of a spherical lens, the curvature is large since aperture is small and a focal distance is short. A difference between heights of lens surfaces in the center and an edge is called a sag amount. If the sag amount is large, it is difficult to manufacture a lens on the basis of molding in a high temperature and high pressure condition. In the invention, the sag amount of ZnS lens is set to be less than 5 mm (sag amount <5 mm).

That is, in the case of the far-infrared lens of the invention, the first to third lenses are made to satisfy the following conditions.

First lens: biconvex lens
Second lens: negative meniscus lens or biconcave lens
Third lens: positive meniscus lens An aspheric surface and a diffraction surface are provided to suppress a spherical aberration and astigmatism.

10 mm $\leq$ f $\leq$ 30 mm
20 mm $\leq$ $f_{12}$ $\leq$ 70 mm
$1 \leq f_{12}/f \leq 3$
1.5 mm<central thickness<8.0 mm
1.0 mm<edge thickness<8.0 mm
Sag amount <5 mm The far-infrared camera lens of the invention can have a wide angle of 20° to 40° as a viewing angle. An F value is about 0.8 to 1.2. Since the lens is manufactured by using cheap ZnS instead of expensive Ge, material cost can be reduced. However, even if the ZnS is used, it takes time and cost to manufacture the lens by cutting. In this case, low-cost manufacturing is not possible. In the invention, a ZnS lens is manufactured by performing hot compression molding (performing molding) of ZnS raw powder using a lens-shaped mold, such that low-cost manufacturing is realized.

In the invention, an optical system can be realized at low cost by making a design satisfying the shape (maximum diameter, lens thickness) suitable for pressure and temperature conditions at the time of molding disclosed in JP-A-11-295501.

In order to secure moldability (mechanical strength, machining precision) in molding under a high temperature and high pressure condition, the lens thickness is preferably large to some degree. However, since absorption is large in the case of ZnS, the transmittance of a lens is reduced if the lens thickness is large. The thickness needs to be determined in consideration of trade-off between moldability and transmittance.

For example, in the case of a high-resolution lens system targeted for an imaging device having a pixel pitch of 25 μm, the invention is designed such that conditions of 1.5 mm<central thickness<8.0 mm, 1.0 mm<edge thickness<8.0 mm, and sag amount <5 mm are satisfied. Thus, both the moldability and the transmittance are satisfied.

One of the applications of a far-infrared camera using the ZnS lens of the invention is a night vision system. This is a night-time pedestrian detection system mounted in an automobile. A pedestrian in the street is detected by sensing a far-infrared ray generated due to the body temperature of a human being. A far-infrared camera lens for a vehicle is strongly requested to have high resolution and be small from demands of an improvement in precision of image recognition, easy mounting of a camera in a vehicle, and the like.

Usually, a far-infrared camera is provided, for example, at a front grille or the periphery of a bumper under severe environment, which is exposed to wind and rain or collides with a flying object while driving. Accordingly, environmentally resistant measures, such as measures against damage or contamination of a lens, are important.

There are cooled-type and non-cooled-type infrared sensors. For the far-infrared camera of the invention, a non-cooled-type thermal imaging device, such as a bolometer, a thermopile detector, or an SOI diode, having sensitivity in a range of 8 to 12 μm is used as a sensor.

Typically, an imaging device having the number of pixels of 160×120 or 320×240 is used as the non-cooled-type thermal imaging device. Since the imaging device is a thermal sensor, it is not possible to make the size of a pixel too small. However, a pixel having a pitch of 25 μm, for example, can be made even now. If a pixel of 25 μm×25 μm is used, the effective area of a sensor having the pixel number described above is 4 mm×3 mm or 8 mm×6 mm. As a result, it is possible to make an image surface small. The lens diameter can be made small if the image surface is small. If the lens diameter is small, the entire camera can be made smaller.

A high-resolution lens excellent in optical performances (brightness, frequency resolution, and temperature resolution) can be manufactured by forming an aspheric surface or a diffraction surface on a surface of a lens without increasing the number of lenses and the lens size. This makes application to image recognition processing easy.

As a lens, a lens having a viewing angle of about 20° to 40° and an F value of about 0.8 to 1.2 is used.

Since a far-infrared lens is manufactured by performing hot compression molding (performing molding) of ZnS raw powder using a lens-shaped mold, material cost and machining cost can be reduced. As a result, the lens can be manufactured at low cost.

An outermost surface of a lens (object side surface of the first lens) exposed to rain, gas, dirt, and the like is preferably coated with a super hard film, such as a DLC coat. Then, the surface strength is increased, and accordingly, environmental resistance is also increased.

The invention is very useful for in-vehicle applications, such as a lens for an in-vehicle far-infrared camera. In addition, the invention is also useful for applications other than the in-vehicle applications.

By performing DLC coat processing on an outermost surface of a lens exposed to the outside environment, the lens is not damaged and dirt is easily removed. Accordingly, the lens is also effective as a lens for a surveillance camera installed in a place where maintenance is not easy.

Since the lens is suitable for detection of a heat emitting body, such as a human being, which emits far-infrared rays, the lens may be used as effective means for rescue activities. In addition, the lens is also useful as a camera lens used to search for a victim under a severe environment such as a mountain or the sea.

In addition, since far-infrared rays which are not visible light are detected, it is possible to precisely detect the location of a human being, which is left indoors, in a fire place full of smoke and having poor field of view. In addition, fire fighting can be quickly and precisely performed by finding a hot spot in a wall or a roof (heat source) in a fire place. The invention may also be applied for thermal image analyses, such as processing for remaining fire.

A focal distance becomes shorter if a lens has a wider angle. Accordingly, it becomes difficult to secure the sufficient back focus BF. In the invention, an optical system having a long (6.0 mm or more) back focus is obtained by configuring the front group using two lenses of the first lens, which has a biconvex shape, and a lens having a negative meniscus shape or a biconcave lens and configuring the rear group using the third lens having a positive meniscus shape.

If the back focus BF is increased, a lens on the image surface side is closer to a lens on the object side. Since off-axis light beams on the image surface side pass through a place distant from the optical axis, a spherical aberration and astigmatism are increased. It is difficult to correct a large spherical aberration or large astigmatism by combination of spherical lenses. Therefore, in the invention, an aspheric surface is used for each surface of a lens system. In the case of the aspheric surface, the spherical aberration and the astigmatism can be satisfactorily corrected.

Wavelength dispersion of ZnS is larger than that of Ge. A chromatic aberration occurs in a ZnS lens, which deteriorates a performance of the ZnS lens. Accordingly, in the invention, a diffraction surface is used to reduce the chromatic aberration. In addition, the diffraction surface also largely contributes to correction of a spherical aberration.

DETAILED DESCRIPTION OF THE PREFERRED EMBODIMENTS

First Embodiment

Figure 1:
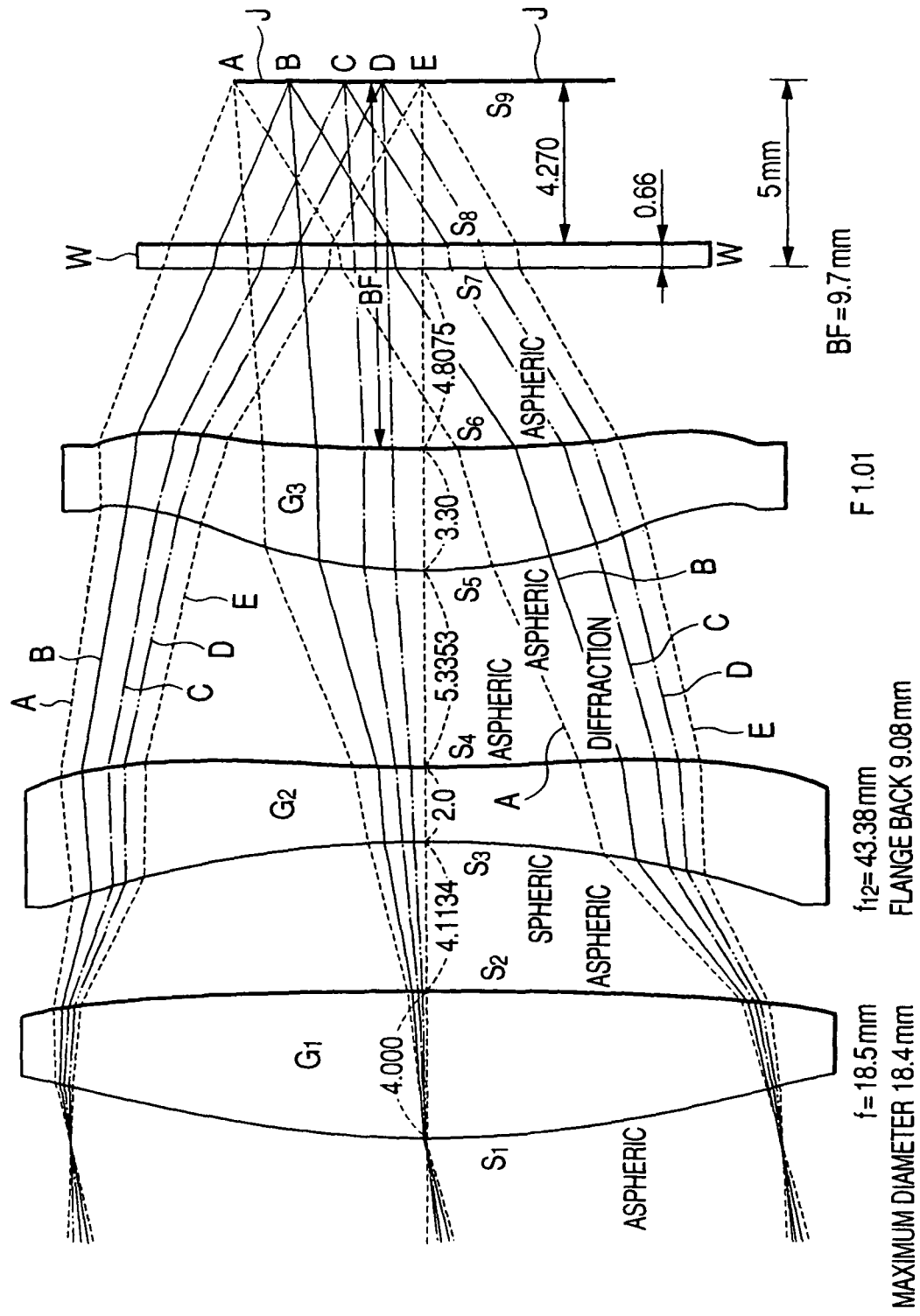
FIG. 1 is a cross-sectional view illustrating a far-infrared camera lens according to a first embodiment of the invention that is configured to include three lenses of: a first lens G1 which is a biconvex lens; a second lens G2 which is a negative meniscus that is concave on an object side; and a third lens G3 which is a positive meniscus that is convex on the object side.
Figure 2:
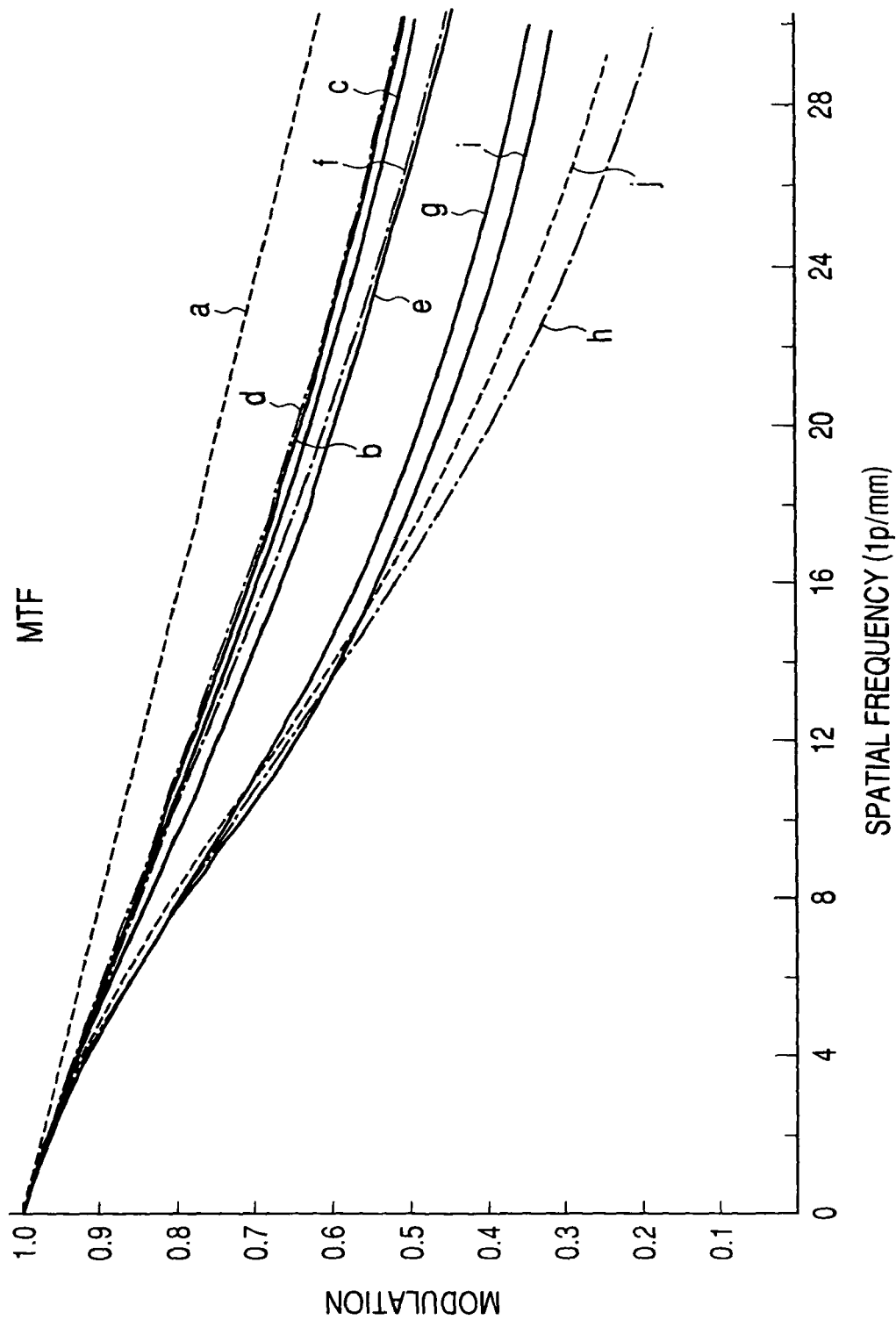
FIG. 2 is a graph illustrating an MTF curve when a spatial frequency of the far-infrared camera lens according to the first embodiment is on a horizontal axis, modulation is on a vertical axis, and an incidence angle is a parameter.

First Embodiment (FIGS. 1 and 2)

ZnS, a set of three lenses (G1, G2, G3)
$f_{12}/f=2.34$
$f=18.5$ mm
$f_{12}=43.38$ mm
F value 1.01
Maximum diameter 18.4 mm
Flange back 9.08 mm
Distortion 0.05%
Viewing angle 30.5°
Back focus (BF) 9.7 mm A first embodiment is an example in which a back focus is set to BF=9.7 mm and $f_{12}/f=2.34$. $f_{12}$ is a composite focal distance of G1 and G2, and f is a total focal distance. The F value of a lens is f/D obtained by dividing the focal distance f by an effective diameter D.

FIG. 1 illustrates a cross section of a lens system according to the first embodiment. This is configured to include three lenses. The three lenses are set to G1, G2, and G3 from an object side. The three lenses are all formed of ZnS. A powder material of ZnS is put into a lens-shaped mold and is then molded in a high temperature and high pressure condition. A flat member corresponding to a fourth sheet is a window W of a sensor. The sensor window W is provided in a sensor and is formed of Ge. A shutter (not shown) is provided between the last lens G3 and the window W. A sensor surface (image surface; image formed surface) J is positioned behind the sensor window W.

The first lens G1, which is an objective lens, is a biconvex lens. Since the first lens G1 has an aspheric surface, the first lens G1 does not have a uniform curvature and is almost flat in an image-surface-side peripheral portion. The second (middle) lens G2 has a concave surface on an object side and a concave surface on an image surface side. The second lens G2 is formed to have an aspheric surface and is complicated, and a peripheral portion of the second lens G2 has a convex surface. The third lens G3 has a convex surface on an object side and a concave surface on an image surface side. The third lens G3 does not have a uniform curvature either. In a peripheral portion of the third lens G3, there is a concave portion on an object side and a convex portion on an image surface side. The outline of the characteristics of the lenses is shown in Table 1.

TABLE 1

| Lens | Surface | Surface type | Radius of curvature (mm) | Surface gap | Aperture radius (mm) |
|---|---|---|---|---|---|
| Object | | | | infinite | |
| G1 Lens | S1 | Aspheric surface | 20.8640 | 4.0000 | 9.2000 |
| | S2 | Aspheric surface | infinite | 4.1134 | 9.6253 |
| G2 Lens | S3 | Spheric surface | −27.0000 | 2.0000 | 9.0795 |
| | S4 | Aspheric surface | −42.4595 | 5.3353 | 9.4535 |
| G3 Lens | S5 | Aspheric surface | 17.6039 | 3.3000 | 8.2909 |
| | S6 | Aspheric surface | 19.4040 | 4.8075 | 8.4190 |
| Window | S7 | | infinite | 0.6600 | 6.6824 |
| | S8 | | infinite | 4.2700 | 6.6143 |

Surface numbers are given to both surfaces of the lenses in the order in a condition that an object placed at the infinity is set to 0. Surfaces of G1 are a surface S1 and a surface S2, surfaces of G2 are a surface S3 and a surface S4, and surfaces of G3 are a surface S5 and a surface S6. Surfaces of the sensor window W are flat surfaces, which are a surface S7 and a surface S8.

Three sets of loci of light beams having different incident angles are shown. They are three kinds of light beams of light beams passing through a topmost portion of the G1 lens, light beams passing through the middle of the G2 lens, and light beams passing through a lower portion of the G3 lens.

A light beam (A) having a most upward incidence angle is shown in a broken line. A light beam (B) having a second incidence angle is shown in a solid line. A light beam (C) having a third largest incidence angle is shown in a one-dotted chain line. A light beam (D) having a fourth incidence angle is shown in a double-dotted chain line. A light beam (E) having a fifth incidence angle is shown in a broken line. Although a number of parallel light beams having the same incident angle pass through the first lens G1, the light beams converge on one point on the image surface J. Thus, the light beams can be represented as three kinds of light beams.

A surface gap means the thickness of a lens and a center-to-center gap between lenses. A distance between an object and the first lens G1 is infinite. The central thickness of the first lens G1 is 4.000 mm. A center-to-center distance between opposite surfaces of the first and second lenses G1 and G2 is 4.1134 mm. The central thickness of the second lens G2 is 2.000 mm. A center-to-center distance between opposite surfaces of the second and third lenses G2 and G3 is 5.3353 mm. The central thickness of the third lens G3 is 3.300 mm. A distance between opposite surfaces of the third lens G3 and the window is 4.8075 mm. The thickness of the sensor window W is 0.660 mm, and a distance between the sensor window and a sensor surface is 4.270 mm.

An object of the invention is to secure a wide angle and the wide back focus BF. The back focus is a distance from the center of a back surface of the last lens to an image surface (sensor face). In the first embodiment in which three lenses are provided, the back focus is a distance from the surface S6 of the third lens G3 to a surface S9 of the sensor surface J.

Since the distance between the third lens G3 and the window is 4.8075 mm, the window thickness is 0.660 mm, and the distance between the window and the sensor surface is 4.270 mm, the sum of those described above, that is, 9.7375 mm is the back focus BF. Although not shown in FIG. 1, a shutter is provided between the sensor window W and the third lens G3 (between S6 and S7; 4.8075 mm in this example). If the back focus is narrow, there is no sufficient room for opening and closing of a shutter.

Irregularity of a lens surface is expressed as follows using a radius coordinate r.

$$Z(r)=(r^2/R)/[1+\{1-(1+K)(r^2/R^2)\}^{1/2}]+A_2 r^2+A_4 r^4+A_6 r^6+A_8 r^8+\ldots+\phi(r) \quad (1)$$

$$\phi(r)=\{1/(n-1)\}\bmod(\Sigma C_j r^j,-\lambda) \quad (2)$$

Z (r) indicates the height of a lens surface at a point having r as a radius coordinate. It is promised that a case of protrusion toward an object side is 'positive' and a case of protrusion toward an image surface side is 'negative'. R is an amount corresponding to a radius of curvature in the case of a spherical lens. A radius of curvature of a curved surface, of which the center is positioned at an object side and an arc is positioned at an image surface side, is expressed as 'negative', and a radius of curvature of a curved surface, of which the center is positioned at an image surface side and an arc is positioned at an object side, is expressed as 'positive'. 'Positive' and 'negative' of R are defined such that concave and convex shapes of front and back surfaces of a lens are opposite to each other.

K is an eccentricity.

$A_2$, $A_4$, $A_6$, ... are second-order, fourth-order, sixth-order, ... aspheric coefficients. This term may also be simply written as $\Sigma A_{2i} r^{2i}$. In case where a spherical lens is used, an aspheric coefficient is 0. When an aspheric lens is used, an aspheric coefficient is a value which is not 0. An aspheric surface is adopted in order to correct aberrations, such as astigmatism, a spherical aberration, and an image surface curvature. It is an object of the invention to provide a lens having a wide back focus BF. Since selection of an aspheric coefficient is not almost relevant to determination of a back focus, the selection of an aspheric coefficient is not described in detail.

An aperture radius is an effective radius of a lens that can receive light. $\phi(r)$ is a function which determines a diffraction surface.

$C_j$ is a j-th order diffraction coefficient. mod(p, q) is a remainder obtained by dividing p by q. That is, q is subtracted whenever p increases by q. A diffraction grating having a concentric ring structure with a height of q is made by deducting q when a curved surface is increased due to an increase in a radius r. Here, a function $C_1 r+C_2 r^2+C_3 r^3+C_4 r^4 \ldots =C_j r^j$ of height and the wavelength λ are compared and the wavelength λ is deducted as much as can be done, thereby obtaining the remainder (0<remainder<λ). Thus, the height of a concentric diffraction grating is determined. The diffraction height $\Sigma C_j r^j$ is compared with +λ when the diffraction height $\Sigma C_j r^j$ is positive, and the diffraction height $\Sigma C_j r^j$ is compared with −λ when the diffraction height $\Sigma C_j r^j$ is negative. In the case of Zns, a chromatic aberration thereof is large. The wavelength dependency of a refractive index and the wavelength dependency of diffraction are opposite to each other. A diffraction surface is used to suppress a chromatic aberration. Since it is not directly related with the determination of the back focus BF, a detailed explanation will be omitted.

(Object Side Surface of G1: Surface S1)

The surface S1 of the first lens G1 is a convex shaped aspheric surface.

Radius of curvature R=20.864 mm

Eccentricity K=−2.7788×10⁻¹

Aspheric coefficients are as follows.

$A_2$=−3.651×10⁻³ mm⁻¹

$A_4$=−2.3277×10⁻⁵ mm⁻³

$A_6$=−1.6359×10⁻⁷ mm⁻⁵

$A_8$=−8.130×10⁻¹⁰ mm⁻⁷

C1=C2=C3=C4= ... =0.

That is, there is no diffraction operation on the surface S1.

An aperture radius of the surface S1 is 9.2000 mm.

(Image-surface-side Surface of G1: Surface S2)

The surface S2 of the first lens G1 is a concave aspheric surface. A radius of curvature is R=infinity. The eccentricity is K=1.0000×10¹⁸. The surface S2 is viewed in the convex shape because the eccentricity is large even though the radius of curvature is infinite. Aspheric coefficients are as follows.

$A_2$=−3.3299×10⁻³ mm⁻¹

$A_4$=7.4046×10⁻⁶ mm⁻³

$A_6$=−3.0895×10⁻⁷ mm⁻⁵

$A_8$=7.171×10⁻¹⁰ mm⁻⁷

Aspheric coefficients having higher orders than those described above are 0.

Diffraction coefficients are as follows.

$C_1$=−7.4455×10⁻⁴

$C_2$=4.5754×10⁻⁶ mm⁻¹

An aperture radius is 9.6253 mm. The first lens G1 is a lens having positive refractive power.

(Object Side Surface of G2: Surface S3)

The surface S3 which is an object side surface of the second lens is a concave aspheric surface. A radius of curvature is R=−27.000 mm. Since the surface S3 is a spherical surface, the shape is determined only by the radius of curvature R.

(Image-surface-side Surface of G2: Surface S4)

The surface S4 which is an image-surface-side surface of the second lens G2 is a concave aspheric surface. A radius of curvature is R=−42.4595 mm. The eccentricity is K=1.0075×10¹. Aspheric coefficients are as follows.

$A_2$=2.6280×10⁻² mm⁻¹

$A_4$=−2.3998×10⁻⁴ mm⁻³

$A_6$=9.5228×10⁻⁷ mm⁻⁵

$A_8$=−1.7313×10⁻⁹ mm⁻⁷

Diffraction coefficients are as follows.

$C_1$=−3.4850×10⁻³

$C_2$=9.3893×10⁻⁶ mm¹

(Object Side Surface G3: Surface S5)

The surface S5 which is an object side surface of the third lens G3 is a convex surface. A radius of curvature is R=17.6039 mm. The eccentricity is K=−5.6857×10⁻¹. Aspheric coefficients are as follows.

$A_2$=1.0543×10⁻² mm⁻¹

$A_4$=5.2642×10⁻⁷ mm⁻³

$A_6$=−8.9599×10⁻⁸ mm⁻⁵

$A_8$=−4.2538×10⁻⁸ mm⁻⁷

Each diffraction coefficient is 0.

(Image-Surface-Side Surface of G3: Surface S6)

The surface S6 which is an image-surface-side surface of the third lens G3 is a concave aspheric surface. A radius of curvature is R=19.4040 mm. The eccentricity is K=−2.4880×10. Aspheric coefficients are as follows.

$A_2$=−1.6381×10⁻² mm⁻¹

$A_4$=5.3411×10⁻⁴ mm⁻³

$A_6$=−8.8408×10⁻⁶ mm⁻⁵

$A_8$=2.7034×10⁻⁸ mm⁻⁷

Each diffraction coefficient is 0.

(Object Side Surface of a Window: Surface S7)

The sensor window is formed integrally with the sensor and is formed of not ZnS but Ge. The object side surface S7 is flat.

(Image-surface-side Surface of a Window: Surface S8)

An image-surface-side surface is also flat. The radius of curvature is infinite and an aspheric coefficient is 0.

Since the back focus BF is 9.7 mm, a predetermined object (BF≧6 mm) is satisfied. Since $f_{12}/f=2.34$, it is in the range of $1≦f_{12}/f≦3$ which is the range described above. Since the F value is 1.01, it is a bright lens.

An MTF curve of the lens according to the first embodiment is shown in FIG. 2. A horizontal axis indicates a spatial frequency (unit: lp/mm). A vertical axis indicates modulation. An incidence angle is set to 0° (on an axis), 3.10°, 6.18°, 10.73°, and 15.15°. Sagittal and tangential of incident light which is incident at each angle are shown. The tangential is a value of a slope of an incidence angle in a direction of a tangential line, and the sagittal is a value in a direction perpendicular to the direction described above.

- a: diffraction limit
- b: light on axis (0°)
- c: 3.10° tangential
- d: 3.10° sagittal
- e: 6.18° tangential
- f: 6.18° sagittal
- g: 10.73° tangential
- h: 10.73° sagittal
- i: 15.15° tangential
- j: 15.15° sagittal From experiences, in order for this lens system to form a high-resolution image on the sensor located on an image surface, MTF at the Nyquist frequency which is the reciprocal (½p) of twice (2p) a pixel pitch p of a sensor should be 0.2 or more. In the case when the pixel pitch is 25 μm, the Nyquist frequency is 20 lp/mm.

According to this graph, sagittal in the 'j' case of an incidence angle of 15.15° decreases to 0.29 at a spatial frequency of 28 lp/mm, to 0.34 at a spatial frequency of 24 lp/mm, and to 0.42 at a spatial frequency of 20 lp/mm. Sagittal in the 'h' case of an incidence angle of 10.73° decreases to 0.20 at a spatial frequency of 28 lp/mm, to 0.29 at a spatial frequency of 24 lp/mm, and to 0.39 at a spatial frequency of 20 lp/mm.

However, in any cases, the condition that an MTF is 0.2 or more at a spatial frequency of 20 lp/mm is satisfied.

TABLE 2

| | MTF | |
|---|---|---|
| | Sagittal | Tangential |
| 0.00° | 0.646 | 0.646 |
| 3.10° | 0.648 | 0.631 |
| 6.18° | 0.611 | 0.598 |
| 10.73° | 0.393 | 0.486 |
| 15.15° | 0.422 | 0.452 |

Table 2 indicates values of sagittal and tangential of MTF at a spatial frequency of 20 lp/mm when incidence angles of the lens in the first embodiment are 0°, 3.1°, 6.18°, 10.73°, and 15.15°. 20 lp/mm is the Nyquist frequency when a pixel pitch is set to 25 μm. In an angle range shown in the graph and the table, MTF is larger than 0.2 when the Nyquist frequency is 20 lp/mm.

High resolution requested when combining an imaging device (8 mm×6 mm) having a pixel pitch of 25 μm and a pixel size of 320×240 can be realized. In this case, since the pixel pitch is p=0.025 mm, the Nyquist frequency is ½p=20 lp/mm. Even when the incidence angle is 15.15°, the MTF at the Nyquist frequency of 20 lp/mm is about 0.4. Since the value is equal to or larger than 0.2, it is possible to obtain a high-resolution camera in combination with an imaging device having a pixel pitch of 25 μm.

In addition, since the lens thickness in the entire lens system can be suppressed small by using an aspheric surface, a bright lens system can be realized. Since sag amount, central thickness, and edge thickness (peripheral thickness) of each lens satisfy conditions, manufacturing based on molding is possible.

Values of sag amount, central thickness, and edge thickness in the first embodiment are enumerated below.

Sag Amount

G1 lens: (object side) 1.4883 mm, (image surface side) 0.4377 mm

G2 lens: (object side) 1.5713 mm, (image surface side) 0.2571 mm

G3 lens: (object side) 1.7502 mm, (image surface side) 0.1502 mm

Edge Thickness:

G1 lens: 2.0740 mm

G2 lens: 3.3142 mm

G3 lens: 1.7000 mm

Second Embodiment

Figure 3:
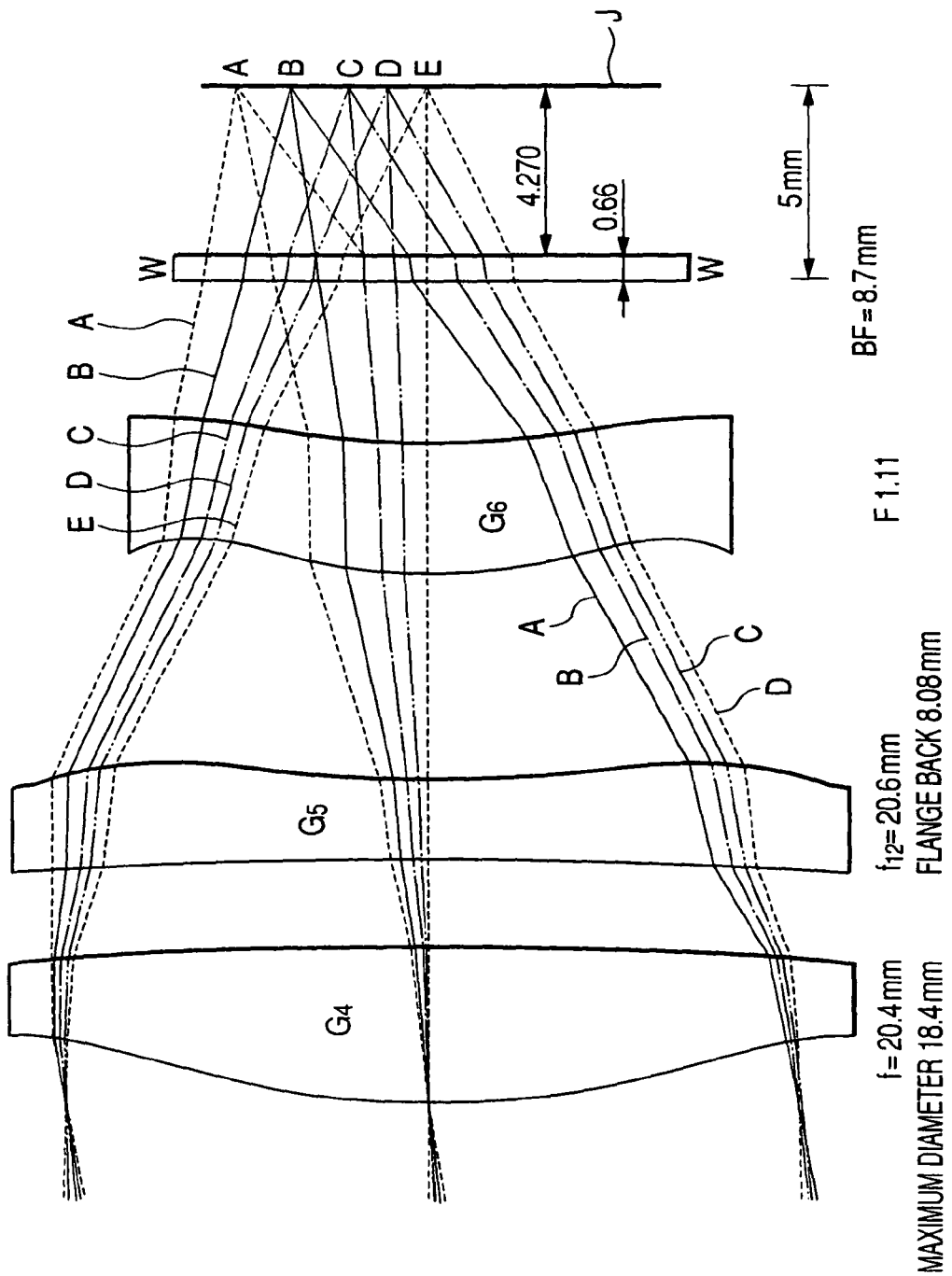
FIG. 3 is a cross-sectional view illustrating a far-infrared camera lens according to a second embodiment of the invention that is configured to include three lenses of: a first lens G4 which is a biconvex lens; a second lens G5 which has a biconcave shape; and a third lens G6 which is a positive meniscus that is convex on an object side.
Figure 4:
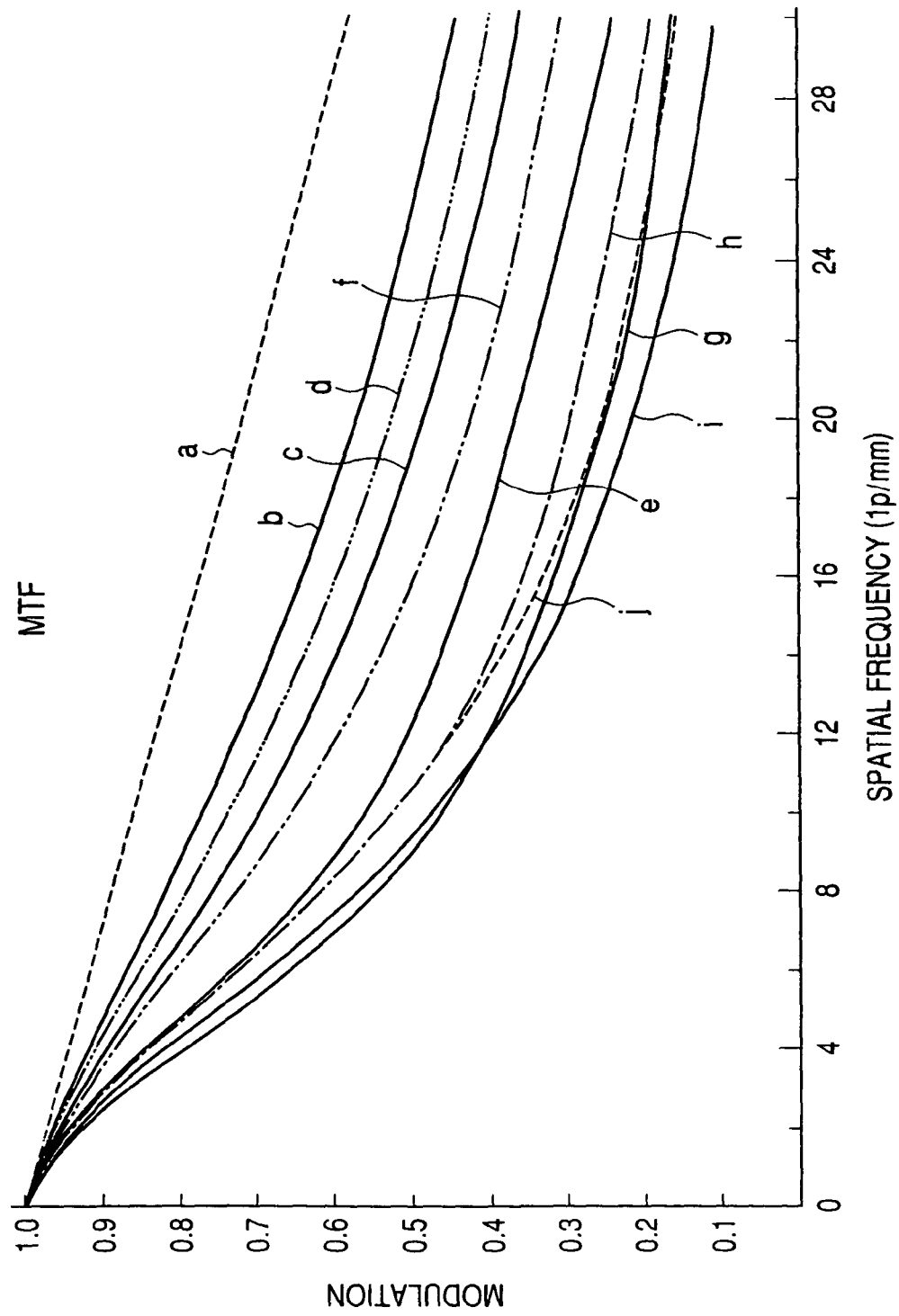
FIG. 4 is a graph illustrating an MTF curve when a spatial frequency of the far-infrared camera lens according to the second embodiment is on a horizontal axis, modulation is on a vertical axis, and an incidence angle is a parameter.

Second Embodiment (FIGS. 3 and 4)

ZnS, a set of three lenses (G4, G5, G6)

$f_{12}/f=1.01$ f=20.4 mm $f_{12}$=20.6 mm

F value 1.11

Maximum diameter 18.4 mm

Flange back 8.08 mm

Distortion 1.78%

Viewing angle 27.1°

Back focus 8.7 mm

A second embodiment is an example in which the back focus BF is set to BF=8.7 mm and $f_{12}/f=1.01$. $f_{12}$ is a composite focal distance of G4 and G5, and f is a total focal distance. The F value of a lens is f/D. Since the F value is 1.11, it is a sufficiently bright lens.

FIG. 3 illustrates a cross section of a lens system according to the second embodiment. This lens system is also configured to include three lenses G4, G5, and G6 and is formed of ZnS. A flat member corresponding to a fourth sheet is a window W of a sensor. The sensor window is provided in a sensor and is formed of Ge. A shutter (not shown) is provided between the last lens G6 and the window W. A sensor surface (image surface; image formed surface) J is positioned behind the window W.

The first lens G4, which is an objective lens, is a biconvex lens. Since both surfaces of the first lens G4 are aspheric surfaces, the first lens G4 does not have a uniform curvature and is almost flat in an image-surface-side peripheral portion. The second (middle) lens G5 has a concave surface on an object side and a concave surface on an image surface side. The second lens G5 is formed to have an aspheric surface and is complicated, and a peripheral portion of the second lens G5 has a convex surface. The third lens G6 has a convex surface on an object side and a concave surface on an image surface side. The third lens G6 does not have a uniform curvature either. In a peripheral portion of the third lens G6, there is a concave portion on an object side and a convex portion on an image surface side.

An MTF curve of the lens according to the second embodiment is shown in FIG. 4. A horizontal axis indicates a spatial frequency (unit: lp/mm). A vertical axis indicates modulation. An incidence angle is set to 0° (on an axis), 2.81°, 5.59°, 9.67°, and 13.55°. Sagittal and tangential of incident light which is incident at each angle are shown.

a: diffraction limit
b: light on axis (0°)
c: 2.81° tangential
d: 2.81° sagittal
e: 5.59° tangential
f: 5.59° sagittal
g: 9.67° tangential
h: 9.67° sagittal
i: 13.55° tangential
j: 13.55° sagittal According to this graph, sagittal in the "i" case of an incidence angle of 13.55° decreases to 0.13 at a spatial frequency of 28 lp/mm, to 0.18 at a spatial frequency of 24 lp/mm, and to 0.26 at a spatial frequency of 20 lp/mm. Sagittal in the 'h' case of an incidence angle of 9.67° decreases to 0.26 at a spatial frequency of 24 lp/mm and to 0.30 at a spatial frequency of 20 lp/mm. However, in any cases, the condition that an MTF is 0.2 or more at a spatial frequency of 20 lp/mm is satisfied. For combination with a sensor configured to include a plurality of pixels, MTF should be 0.2 or more at the Nyquist frequency corresponding to the pixel size. This satisfies a condition that the MFT is 0.2 or more at a spatial frequency of 20 lp/mm for all incidence angles within 13.55°.

TABLE 3

| | MTF | |
|---|---|---|
| | Sagittal | Tangential |
| 0.00° | 0.315 | 0.315 |
| 2.81° | 0.528 | 0.488 |
| 5.59° | 0.426 | 0.368 |
| 9.67° | 0.297 | 0.252 |
| 13.55° | 0.257 | 0.21 |

Table 3 indicates values of sagittal and tangential of MTF at a spatial frequency of 20 lp/mm when incidence angles of the lens in the second embodiment are 0°, 2.81°, 5.59°, 9.67°, and 13.55°. 20 lp/mm is the Nyquist frequency when a pixel pitch is set to 25 μm. If the pixel pitch is made smaller, an MTF at a higher spatial frequency causes a problem. In the case when an incidence angle is 13.55°, an MTF of sagittal is 0.257 and an MTF of tangential is 0.21. The other values are larger than those values. That is, in an angle range shown in the graph and the table, an MTF is larger than 0.2 at 20 lp/mm. Since a viewing angle is twice an effective incidence angle, the viewing angle is 27.1° in this lens system.

Values of sag amount, central thickness, and edge thickness in the second embodiment are enumerated below.

Sag Amount
G4 lens: (object side) 1.5136 mm, (image surface side) 0.3874 mm
G5 lens: (object side) 0.2991 mm, (image surface side) 0.0070 mm
G6 lens: (object side) 0.8788 mm, (image surface side) 0.7094 mm
Central Thickness
G4 lens: 4.0 mm
G5 lens: 2.0 mm
G6 lens: 3.3 mm
Edge Thickness
G4 lens: 2.0990 mm
G5 lens: 2.2921 mm
G6 lens: 3.1306 mm Third Embodiment Third embodiment (FIGS. 5 and 6)

ZnS, a set of three lenses (G7, G8, G9)
$f_{12}/f=2.98$
$f=17.8$ mm
$f_{12}=53$ mm
F value 1.02
Maximum diameter 17.4 mm
Flange back 8.08 mm
distortion 4.64%
Viewing angle 30.1°
Back focus 8.7 mm A third embodiment is an example in which the back focus BF is set to BF=8.7 mm and $f_{12}/f=2.98$. Since the F value is 1.02, it is a sufficiently bright lens.

Figure 5:
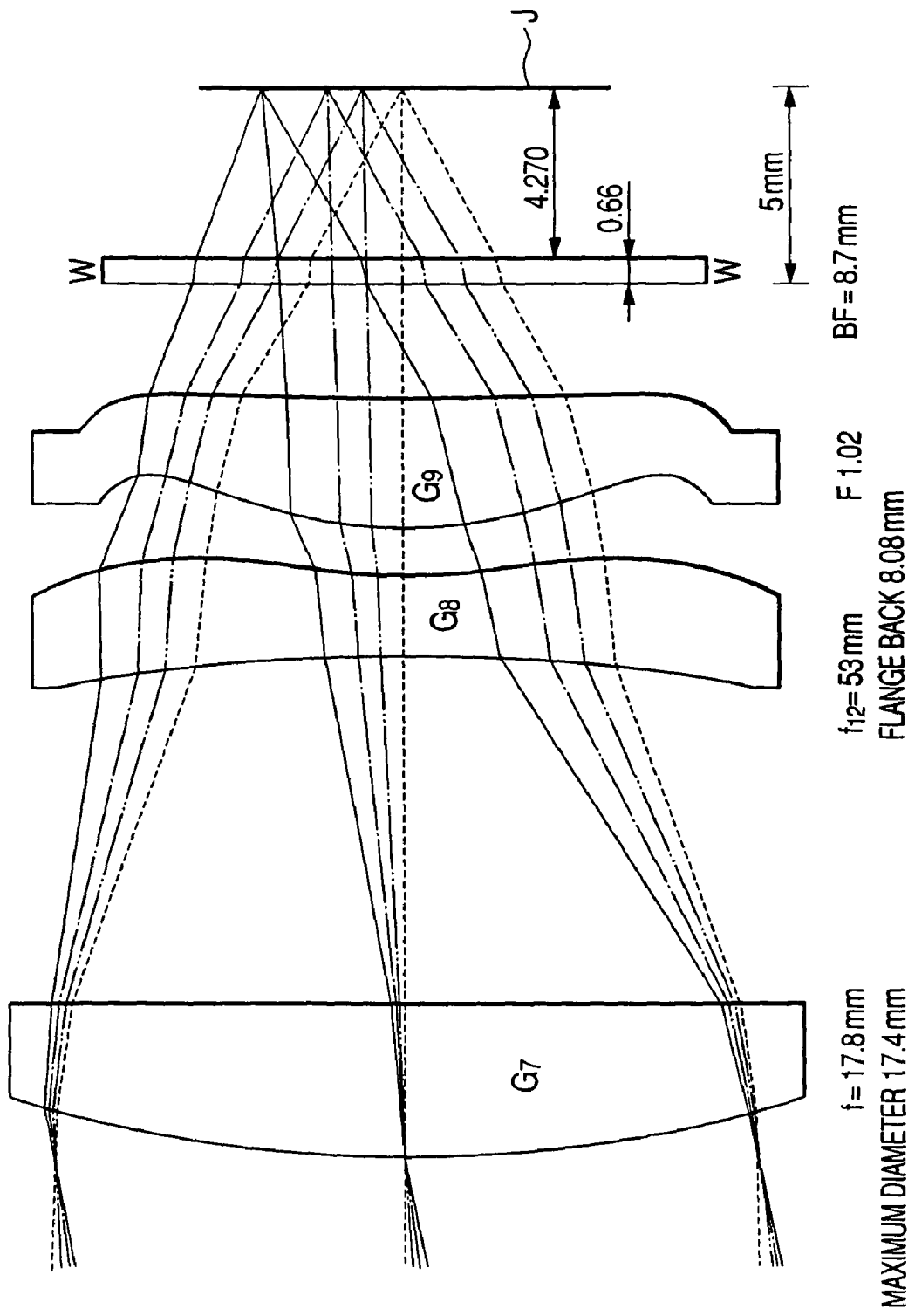
FIG. 5 is a cross-sectional view illustrating a far-infrared camera lens according to a third embodiment of the invention that is configured to include three lenses of: a first lens G7 which is a plano-convex lens that is convex on an object side and flat on an image surface side; a second lens G8 which has a biconcave shape; and a third lens G9 which is a positive meniscus that is convex on the object side.
Figure 6:
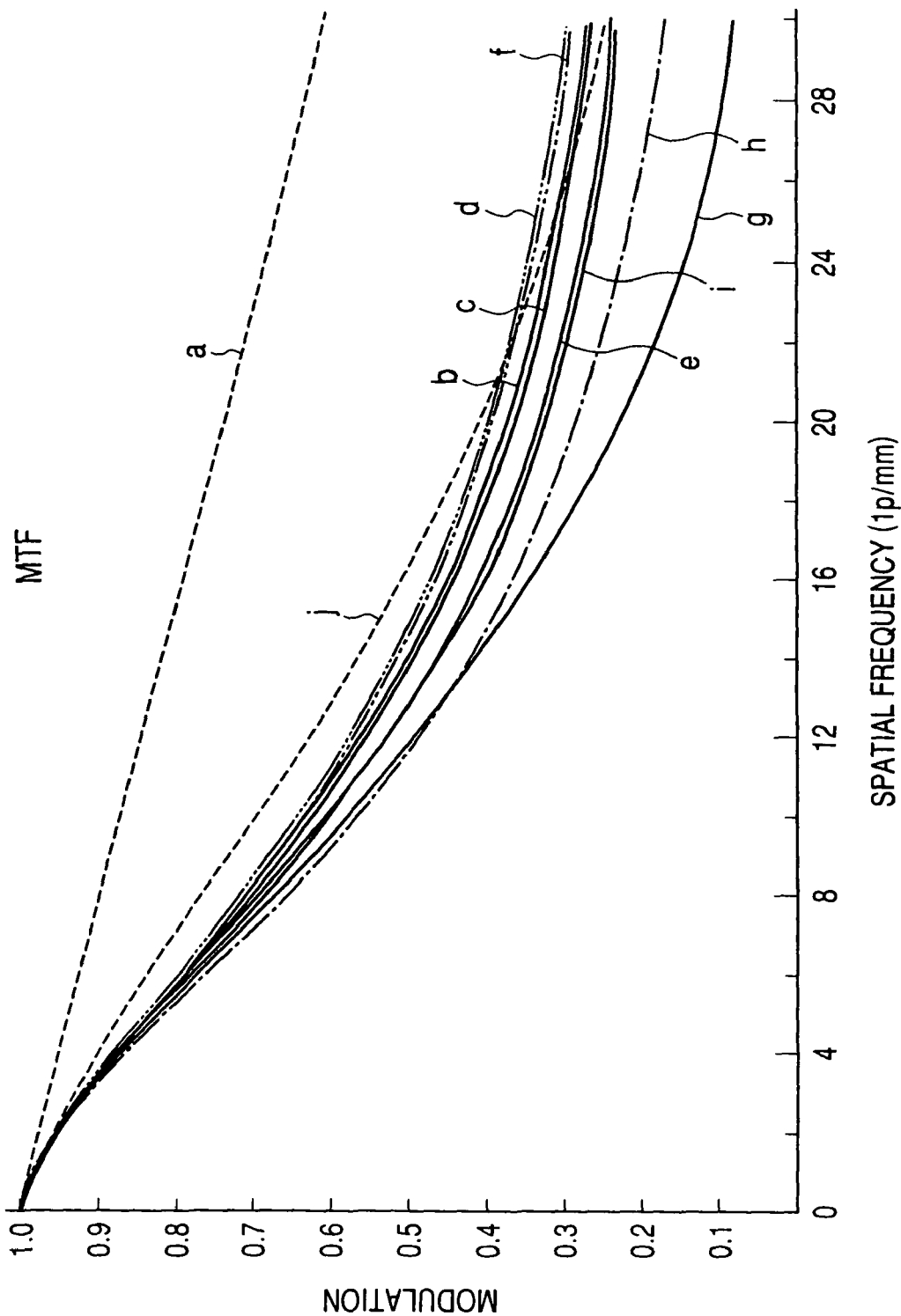
FIG. 6 is a graph illustrating an MTF curve when a spatial frequency of the far-infrared camera lens according to the third embodiment is on a horizontal axis, modulation is on a vertical axis, and an incidence angle is a parameter.

FIG. 5 illustrates a cross section of a lens system according to the third embodiment. This lens system is also configured to include three lenses G7, G8, and G9 and is formed of ZnS. A flat member corresponding to a fourth sheet is a window W of a sensor. The sensor window is provided in a sensor and is formed of Ge. A shutter (not shown) is provided between the last lens G9 and the window W. A sensor surface (image surface; image formed surface) J is positioned behind the window W.

The first lens G7, which is an objective lens, is a biconvex lens. A first surface is a very convex surface, but a second surpage is almost flat. The second (middle) lens G8 has a concave surface on an object side and a concave surface on an image surface side. The second lens G8 is formed to have an aspheric surface and is complicated, and a peripheral portion of the second lens G8 has a convex surface. The third lens G9 has a convex surface on an object side and a concave surface on an image surface side. The third lens G9 is very convex on the object side but is almost flat on the image surface side. The third lens G9 does not have a uniform curvature either. In a peripheral portion of the third lens G9, there is a concave portion on an object side and a convex portion on an image surface side.

An MTF curve of the lens according to the third embodiment is shown in FIG. 6. A horizontal axis indicates a spatial frequency (unit: lp/mm). A vertical axis indicates modulation. An incidence angle is set to 0° (on an axis), 3.21°, 6.35°, 10.90°, and 15.05°. Sagittal and tangential of incident light which is incident at each angle are shown.

a: diffraction limit
b: light on axis (0°)
c: 3.21° tangential
d: 3.21° sagittal
e: 6.35° tangential
f: 6.35° sagittal
g: 10.90° tangential
h: 10.90° sagittal
i: 15.05° tangential
j: 15.05° sagittal For all incidence angles, an MTF should be 0.2 or more at the Nyquist frequency corresponding to the pixel size. The Nyquist frequency changes with the pixel size of a sensor. As described above, in the case of a sensor having a pixel with 25

μm square, the Nyquist frequency is 20 lp/mm. In the above angle range, the MTF is 0.2 or more at a spatial frequency of 20 lp/mm.

According to this graph, sagittal in the 'g' case of an incidence angle of 10.90° decreases to 0.13 at a spatial frequency of 28 lp/mm, to 0.18 at a spatial frequency of 24 lp/mm, and to 0.23 at a spatial frequency of 20 lp/mm. Sagittal in the 'h' case of an incidence angle of 10.90° decreases to 0.24 at a spatial frequency of 24 lp/mm and to 0.29 at a spatial frequency of 20 lp/mm. However, in any cases, the condition that an MTF is 0.2 or more at a spatial frequency of 20 lp/mm is satisfied.

TABLE 4

| | MTF | |
|---|---|---|
| | Sagittal | Tangential |
| 0.00° | 0.377 | 0.377 |
| 3.21° | 0.398 | 0.365 |
| 6.35° | 0.399 | 0.334 |
| 10.90° | 0.287 | 0.229 |
| 15.05° | 0.41 | 0.319 |

Table 4 indicates values of sagittal and tangential of MTF at a spatial frequency of 20 lp/mm when incidence angles of the lens in the second embodiment are 0°, 3.21°, 6.35°, 10.90°, and 15.05° C. 20 lp/mm is the Nyquist frequency when a pixel pitch is set to 25 μm. If the pixel pitch is made smaller, an MTF at a higher spatial frequency causes a problem.

In the case when an incidence angle is 10.90°, an MTF of sagittal is 0.287 and an MTF of tangential is 0.229. The other values are larger than those values. That is, in an angle range shown in the graph and the table, an MTF is larger than 0.2 at 20 lp/mm. Since a viewing angle is twice an effective incidence angle, the viewing angle is 30.1° in this lens system.

Values of sag amount, central thickness, and edge thickness in the third embodiment are enumerated below.

Figure 7:
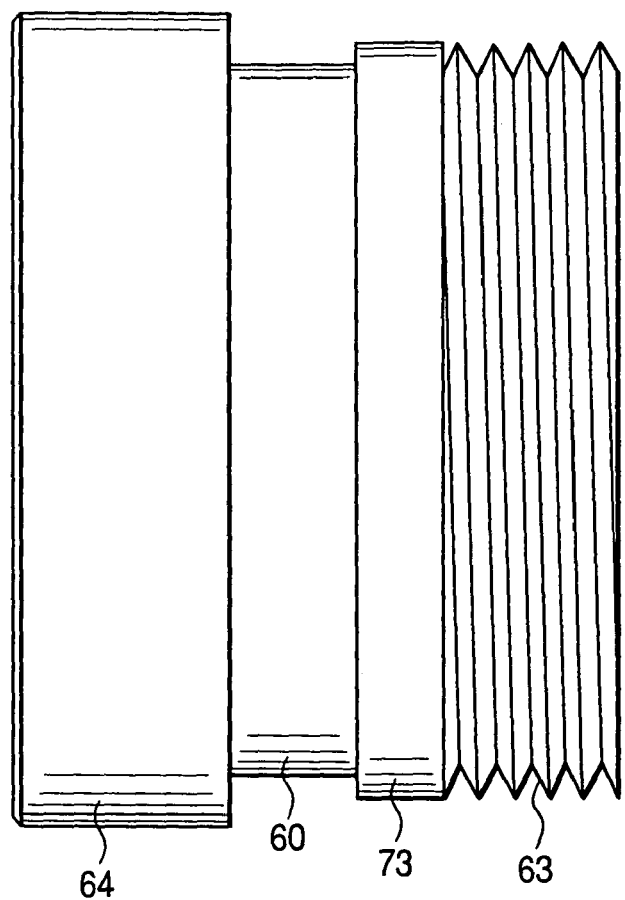
FIG. 7 is a side surface view illustrating a lens unit according to a fourth embodiment of the invention in which the far-infrared lens according to the first embodiment and a spacer are provided in a lens barrel and a lens presser is fixed to the lens barrel.
Figure 8:
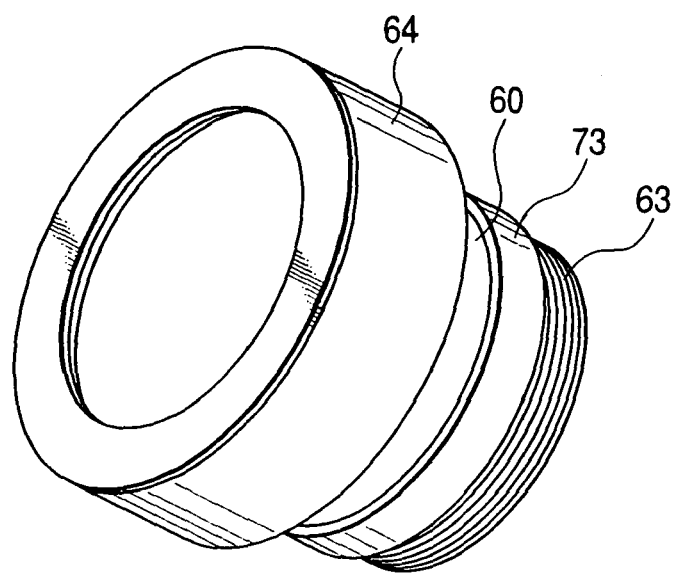
FIG. 8 is a perspective view illustrating the lens unit according to the fourth embodiment of the invention in which the far-infrared lens according to the first embodiment and the spacer are provided in the lens barrel and the lens presser is fixed to the lens barrel.
Figure 9:
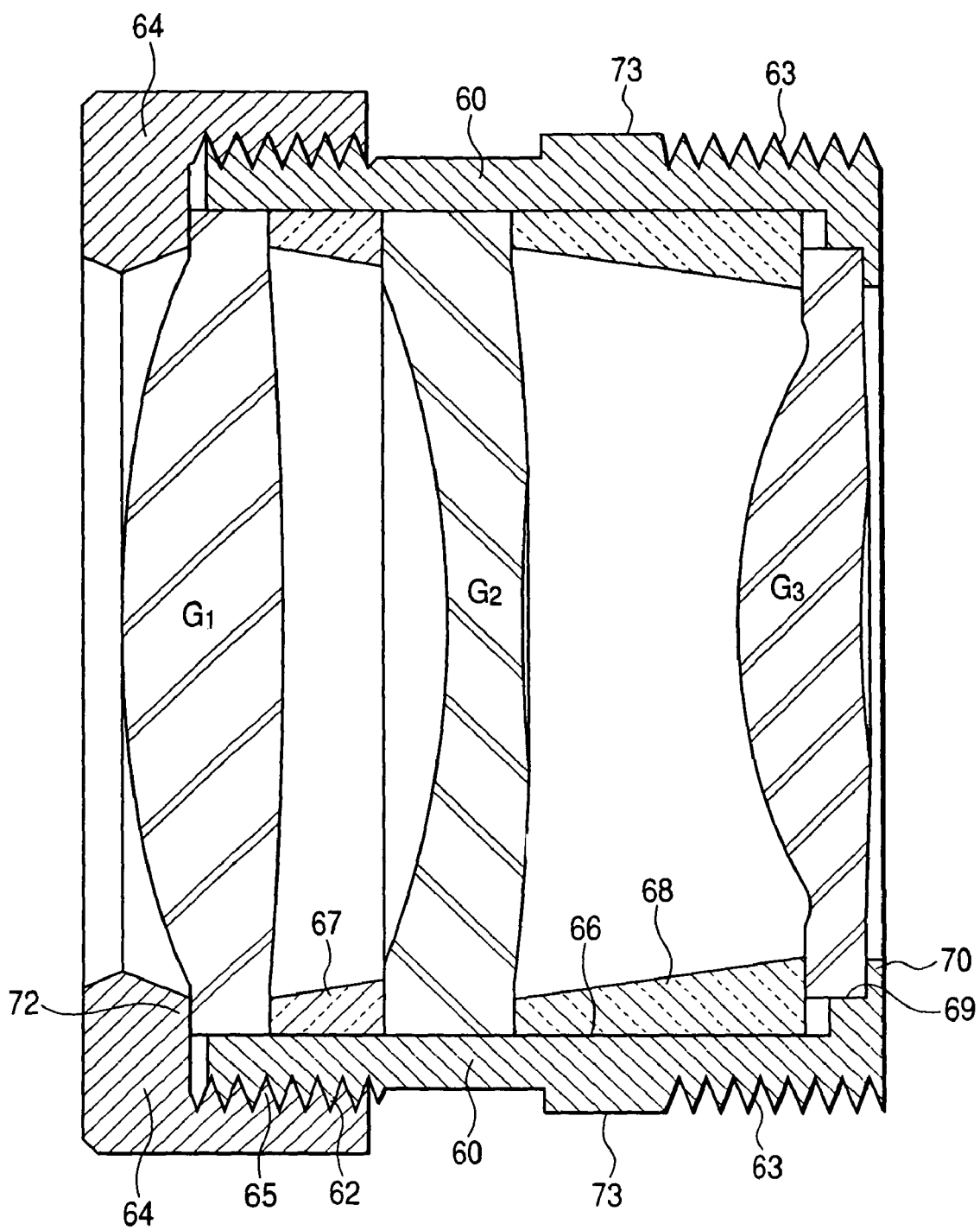
FIG. 9 is a longitudinal sectional view illustrating the lens unit according to the fourth embodiment of the invention in which the far-infrared lens according to the first embodiment and the spacer are provided in the lens barrel and the lens presser is fixed to the lens barrel.

Sag Amount
G7 lens: (object side) 1.2488 mm, (image surface side) 0.7375 mm
G8 lens: (object side) 0.7877 mm, (image surface side) 0.2215 mm
G9 lens: (object side) 0.8541 mm, (image surface side) 0.7431 mm
Central Thickness
G7 lens: 4.0 mm
G8 lens: 2.0 mm
G9 lens: 3.3 mm
Edge Thickness:
G7 lens: 2.0137 mm
G8 lens: 2.5662 mm
G9 lens: 1.7028 mm Fourth Embodiment Fourth Embodiment: A Lens Unit Configured to Include Three Lenses (FIGS. 7, 8, and 9)

A lens unit is formed by using a set of far-infrared lenses according to the first embodiment. An entire side surface view of the lens unit is shown in FIG. 7. A perspective view of the lens unit is shown in FIG. 8. A longitudinal sectional view of the lens unit is shown in FIG. 9.

A lens barrel 60, which is formed of metal and has a cylindrical shape, has a male thread strip 62 on a front outer peripheral surface and a male thread portion 63 on a rear outer peripheral surface. An inner peripheral surface is a smooth inner tubular surface 66. The inner tubular surface 66 is a stepped portion 69 protruding in a rear part thereof. A locking protrusion 70 is positioned behind the stepped portion 69. There is a smooth portion 73 in the middle of the outer peripheral portion.

A lens presser 64, which is formed of metal and has a box nut shape, has a female thread portion 65 and a front portion 72 having a slightly small diameter on a front part thereof. The lens barrel 60 and the lens presser 64 can be formed of aluminum, for example.

The first lens G1, a first 67, the second lens G2, and a second spacer 68 are inserted along the inner tubular surface 66 of the lens barrel 60. The third lens G3 internally touches the stepped portion 69 in a further rear side. A rear surface of the third lens G3 is pressed by the locking protrusion 70. The position of the third lens G3 in the axial direction thereof is determined. The second spacer 68 has an approximately cylindrical shape and is inserted between the third lens G3 and the second lens G2 such that the relative position between the second and third lenses G2 and G3 is determined. The first spacer 67 is positioned between the second lens G2 and the first lens G1 such that the relative position between the first and second lenses G1 and G2 is determined. The lens presser 64 is screwed to the front male thread portion 62 of the lens barrel 60 to thereby press the front portion 72 of the first lens G1.

By operations of the spacers 67 and 68, a distance between the first and second lenses G1 and G2 is set to 4.1134 mm and a distance between the second and third lenses G2 and G3 is set to 5.3353 mm. The spacers 67 and 68 are formed in a ring shape by using aluminum, ceramics, plastics, and the like.

Fifth Embodiment

Figure 10:
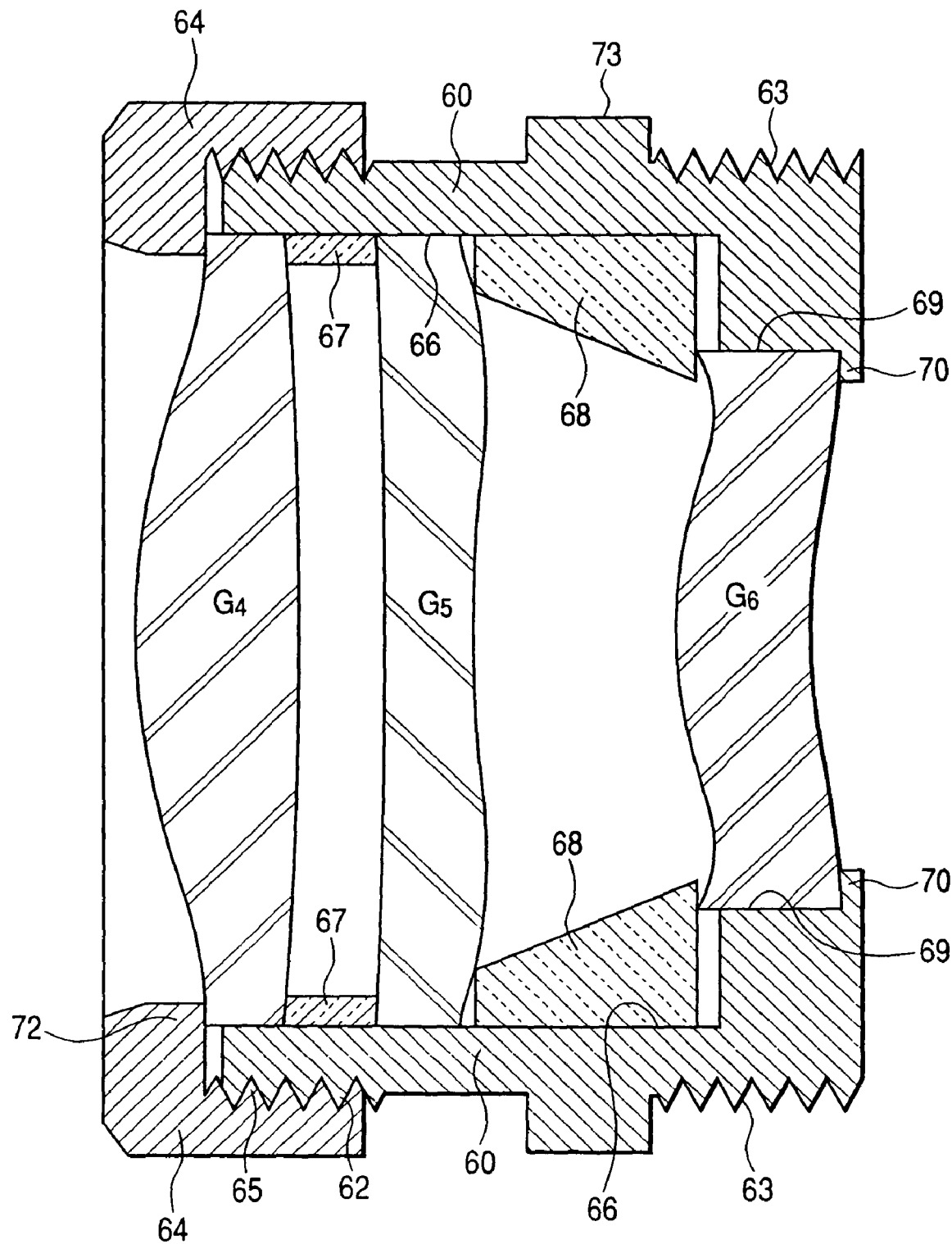
FIG. 10 is a longitudinal sectional view illustrating the lens unit according to a fifth embodiment of the invention in which the far-infrared lens according to the second embodiment and the spacer are provided in the lens barrel and the lens presser is fixed to the lens barrel.

Fifth Embodiment: A Lens Unit Configured to Include Three Lenses (FIG. 10)

A lens unit is formed by using a set of far-infrared lenses according to the second embodiment. A side surface view and a perspective view of the lens unit are almost the same as those shown in FIGS. 7 and 8. A longitudinal sectional view of the lens unit is shown in FIG. 10.

A lens barrel 60, which is formed of metal and has a cylindrical shape, has a male thread strip 62 on a front outer peripheral surface and a male thread portion 63 on a rear outer peripheral surface. An inner peripheral surface is a smooth inner tubular surface 66. The inner tubular surface 66 is a stepped portion 69 protruding in a rear part thereof. A locking protrusion 70 is positioned behind the stepped portion 69.

A lens presser 64, which is formed of metal and has a box nut shape, has a female thread portion 65 and a front portion 72 having a slightly small diameter on a front part thereof. The lens barrel 60 and the lens presser 64 can be formed of aluminum, for example.

The first lens G4, a first 67, the second lens G5, and a second spacer 68 are inserted along the inner tubular surface 66 of the lens barrel 60. The third lens G6 internally touches the stepped portion 69 in a further rear side. A rear surface of the third lens G6 is pressed by the locking protrusion 70. The position of the third lens G6 in the axial direction thereof is determined. The second spacer 68 has an approximately cylindrical shape and is inserted between the third lens G6 and the second lens G5 such that the relative position between the second and third lenses G5 and G6 is determined. Since the outer diameter of the third lens G6 is small, a wedgeshaped cross section spread in a rear side is obtained. The first spacer 67 is positioned between the second lens G5 and the first lens G4 such that the relative position between the first and second lenses G4 and G5 is determined. The lens presser 64 is screwed to the front male thread strip 62 of the lens barrel 60 to thereby press the front portion 72 of the first lens G4.

The spacers 67 and 68 are formed in a ring shape by using aluminum, ceramics, plastics, and the like.

Sixth Embodiment

Figure 11:
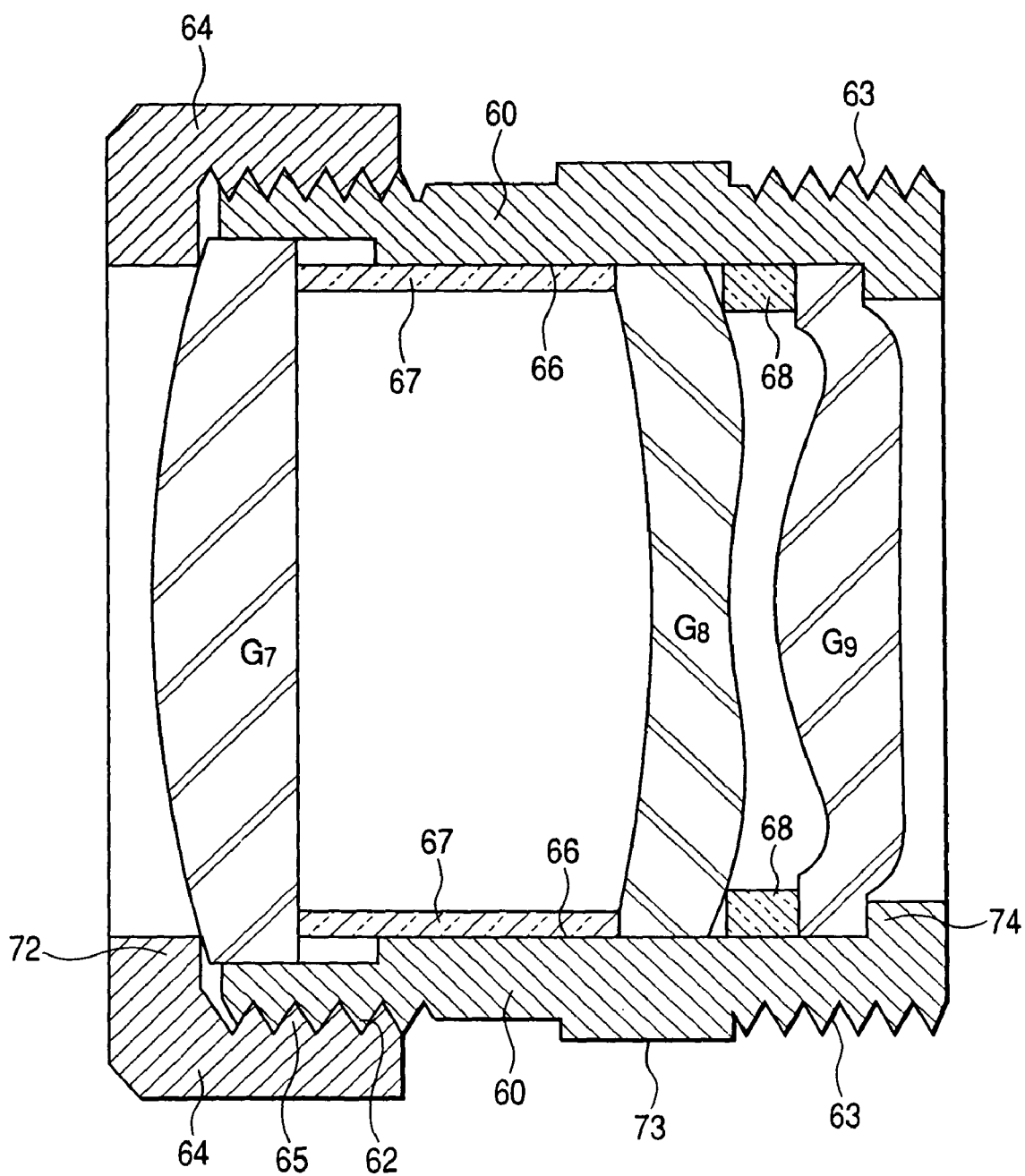
FIG. 11 is a longitudinal sectional view illustrating a lens unit according to a sixth embodiment of the invention in which the far-infrared lens according to the third embodiment and a spacer are provided in a lens barrel and a lens presser is fixed to the lens barrel.

Sixth Embodiment: A Lens Unit Configured to include Three Lenses (FIG. 11)

A lens unit is formed by using a set of far-infrared lenses according to the third embodiment. A side surface view and a perspective view of the lens unit are almost the same as those shown in FIGS. 7 and 8. A longitudinal sectional view of the lens unit is shown in FIG. 11.

A lens barrel 60, which is formed of metal and has a cylindrical shape, has a male thread strip 62 on a front outer peripheral surface and a male thread portion 63 on a rear outer peripheral surface. An inner peripheral surface is a smooth inner tubular surface 66. The inner tubular surface 66 has a locking protrusion 74 positioned in a rear part thereof.

A lens presser 64, which is formed of metal and has a box nut shape, has a female thread portion 65 and a front portion 72 having a slightly small diameter on a front part thereof. The lens barrel 60 and the lens presser 64 can be formed of aluminum, for example. The first lens G7, a first 67, the second lens G8, and a second spacer 68 are inserted along the inner tubular surface 66 of the lens barrel 60. A rear surface of the third lens G9 is pressed by the locking protrusion 74. The position of the third lens G9 in the axial direction thereof is determined. The second spacer 68 has an approximately cylindrical shape and is inserted between the third lens G9 and the second lens G8 such that the relative position between the second and third lenses G8 and G9 is determined. The first spacer 67 is positioned between the second lens G8 and the first lens G7 such that the relative position between the first and second lenses G7 and G8 is determined. The female thread portion 65 of the lens presser 64 is screwed to the front male thread portion 62 of the lens barrel 60 to thereby press a front portion 72 of the first lens G7.

The spacers 67 and 68 are formed in a ring shape by using aluminum, ceramics, plastics, and the like.

Seventh Embodiment

Figure 12:
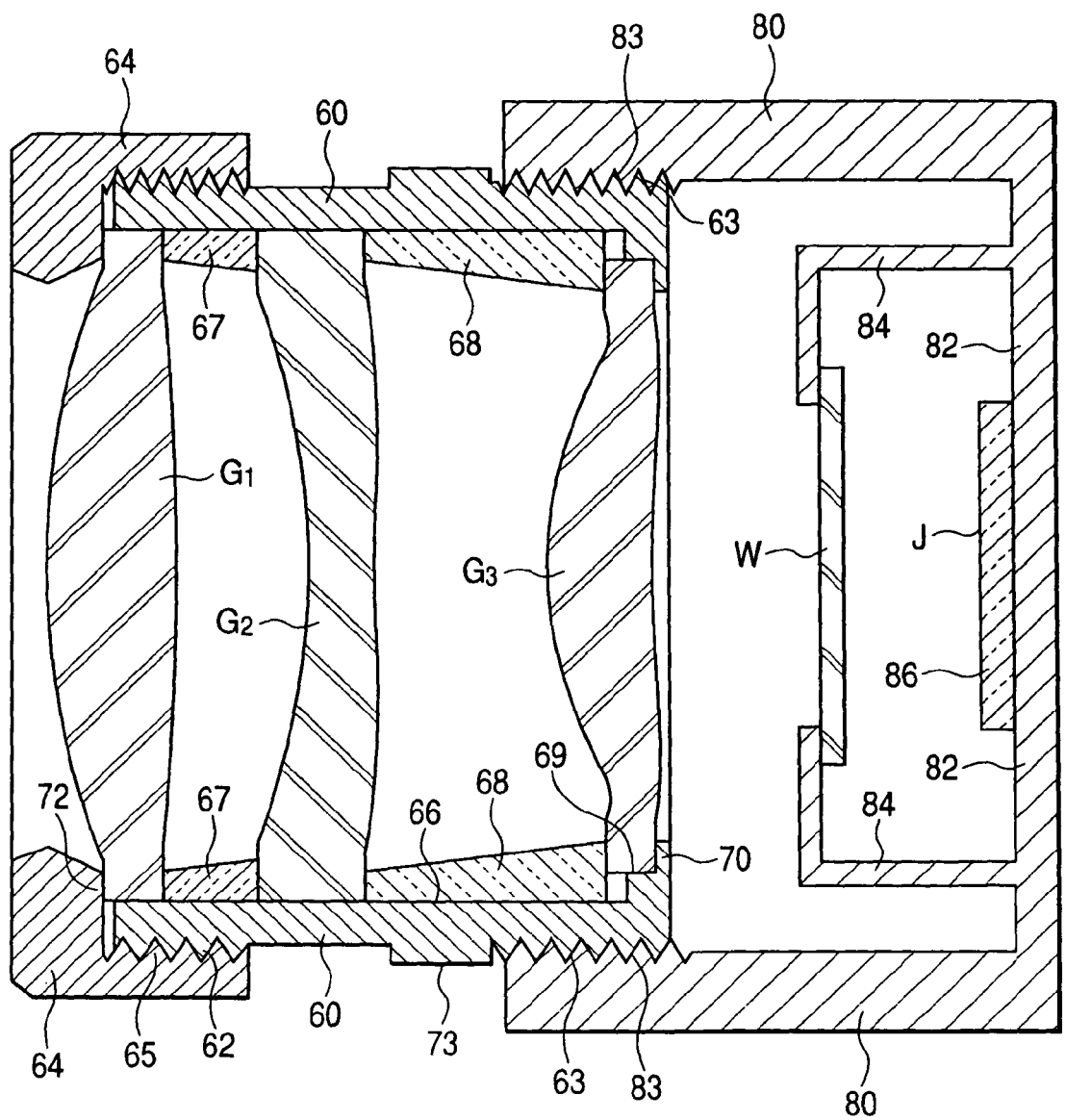
FIG. 12 is a longitudinal sectional view illustrating an imaging apparatus according to a seventh embodiment of the invention in which an imaging device is combined with the lens unit according to the fourth embodiment.

Seventh Embodiment: Imaging Apparatus in which an Imaging Device is Combined with a Lens Unit Including Three Lenses (FIG. 12)

In a seventh embodiment, an imaging apparatus is formed by combining an imaging device with the far-infrared lens unit according to the fourth embodiment. A longitudinal sectional view of the entire imaging apparatus according to the seventh embodiment is shown in FIG. 12.

A lens barrel 60, which is formed of metal and has a cylindrical shape, has a male thread strip 62 on a front outer peripheral surface and a male thread portion 63 on a rear outer peripheral surface. An inner peripheral surface is a smooth inner tubular surface 66. The inner tubular surface 66 is a stepped portion 69 protruding in a rear part thereof. A locking protrusion 70 is positioned behind the stepped portion 69. There is a smooth portion 73 in the middle of the outer peripheral portion.

A lens presser 64, which is formed of metal and has a box nut shape, has a female thread portion 65 and a front portion 72 having a slightly small diameter on a front part thereof. The lens barrel 60 and the lens presser 64 can be formed of aluminum, for example.

The first lens G1, the first 67, the second lens G2, and the second spacer 68 are inserted along the inner tubular surface 66 of the lens barrel 60. The third lens G3 internally touches the stepped portion 69 in a further rear side. A rear surface of the third lens G3 is pressed by the locking protrusion 70. The position of the third lens G3 in the axial direction thereof is determined. The second spacer 68 has an approximately cylindrical shape and is inserted between the third lens G3 and the second lens G2 such that the relative position between the second and third lenses G2 and G3 is determined. The first spacer 67 is positioned between the second lens G2 and the first lens G1 such that the relative position between the first and second lenses G1 and G2 is determined. The lens presser 64 is screwed to the front male thread portion 62 of the lens barrel 60 to thereby press the front portion 72 of the first lens G1.

By operations of the spacers 67 and 68, a distance between the first and second lenses G1 and G2 is set to 4.1134 mm and a distance between the second and third lenses G2 and G3 is set to 5.3353 mm. The spacers 67 and 68 are formed in a ring shape by using aluminum, ceramics, plastics, and the like.

An imaging device holder 80 having a cylindrical shape has a female thread portion 83 on an inner front side and a bottom plate 82 in the back. On the bottom plate 82, a cylindrical window holder 84 having an opening is formed. The window W is fixed to the opening of the window holder 84. An imaging device chip 86 is fixed to a middle portion of the bottom plate 82. A front surface of the imaging device chip 86 is the image surface J. The female thread portion 83 is screwed to the male thread portion 63 of the lens barrel 60. In this manner, the imaging apparatus in which the imaging device and the lens unit are integrally formed is obtained.

Eighth Embodiment

Figure 13:
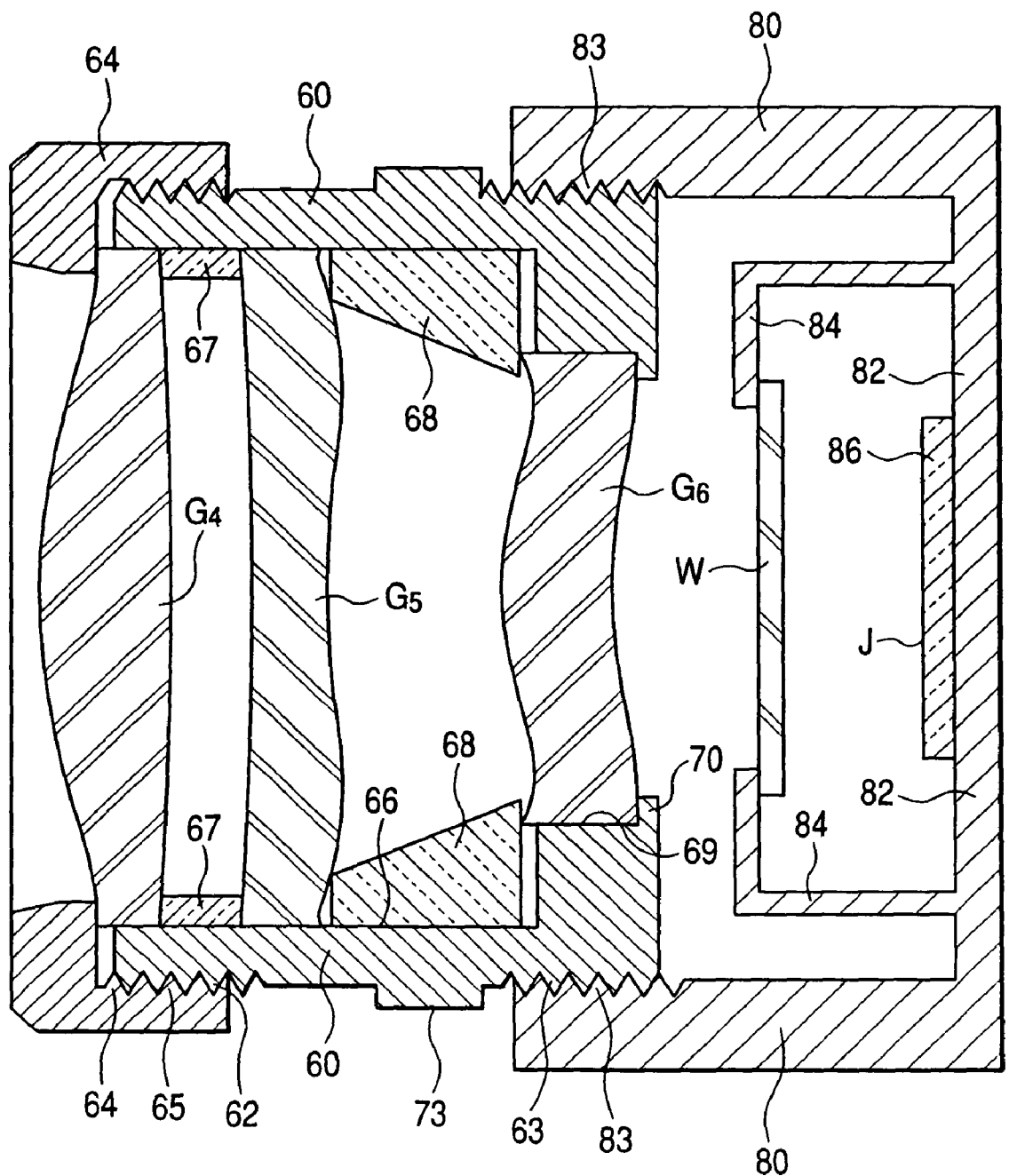
FIG. 13 is a longitudinal sectional view illustrating an imaging apparatus according to an eighth embodiment of the invention in which an imaging device is combined with the lens unit according to the fifth embodiment.

Eighth Embodiment: Imaging Apparatus in which an Imaging Device is Combined with a Lens Unit including Three Lenses (FIG. 13)

In an eighth embodiment, an imaging apparatus is formed by combining an imaging device with the far-infrared lens unit according to the fifth embodiment. A longitudinal sectional view of the entire imaging apparatus according to the eighth embodiment is shown in FIG. 13.

A lens barrel 60, which is formed of metal and has a cylindrical shape, has a male thread strip 62 on a front outer peripheral surface and a male thread portion 63 on a rear outer peripheral surface. An inner peripheral surface is a smooth inner tubular surface 66. The inner tubular surface 66 is a stepped portion 69 protruding in a rear part thereof. A locking protrusion 70 is positioned behind the stepped portion 69. There is a smooth portion 73 in the middle of the outer peripheral portion.

A lens presser 64, which is formed of metal and has a box nut shape, has a female thread portion 65 and a front portion 72 having a slightly small diameter on a front part thereof. The lens barrel 60 and the lens presser 64 can be formed of aluminum, for example.

The first lens G4, the first 67, the second lens G5, and the second spacer 68 are inserted along the inner tubular surface 66 of the lens barrel 60. The third lens G6 internally touches the stepped portion 69 in a further rear side. A rear surface of the third lens G6 is pressed by the locking protrusion 70. The position of the third lens G6 in the axial direction thereof is determined. The second spacer 68 has an approximately cylindrical shape and is inserted between the third lens G6 and the second lens G5 such that the relative position between the second and third lenses G5 and G6 is determined. The first spacer 67 is positioned between the second lens G5 and the first lens G4 such that the relative position between the first and second lenses G4 and G5 is determined. The female thread portion 65 of the lens presser 64 is screwed to the front male thread strip 62 of the lens barrel 60. The lens presser 64 presses the front portion 72 of the first lens G4.

The spacers 67 and 68 are formed in a ring shape by using aluminum, ceramics, plastics, and the like.

An imaging device holder 80 having a cylindrical shape has a female thread portion 83 on an inner front side and a bottom plate 82 in the back. On the bottom plate 82, a cylindrical window holder 84 having an opening is formed. The window W is fixed to the opening of the window holder 84. An imaging device chip 86 is fixed to a middle portion of the bottom plate 82. A front surface of the imaging device chip 86 is the image surface J. The female thread portion 83 is screwed to the male thread portion 63 of the lens barrel 60. In this manner, the imaging apparatus in which the imaging device and the lens unit are integrally formed is obtained.

Ninth Embodiment

Figure 14:
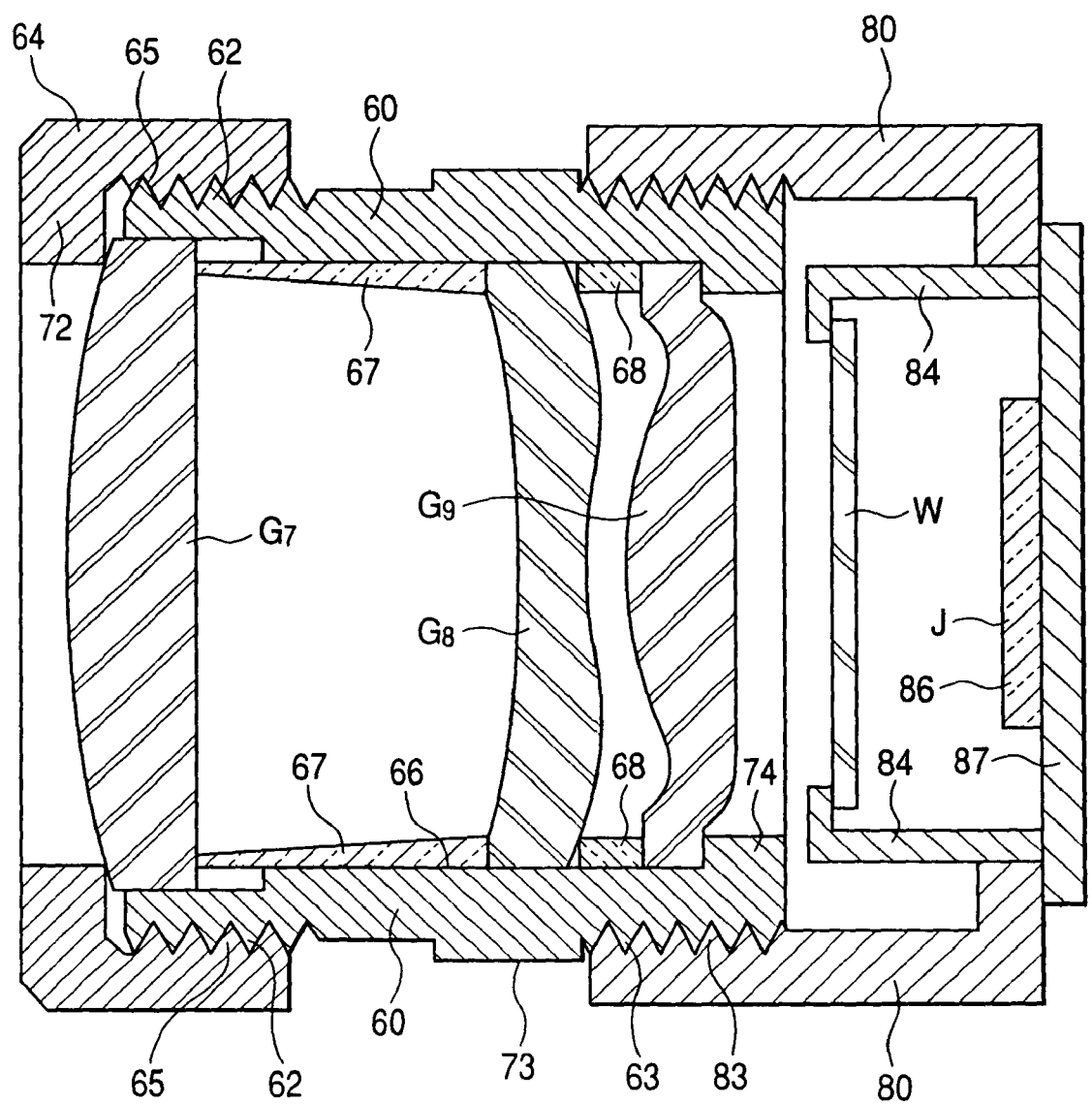
FIG. 14 is a longitudinal sectional view illustrating an imaging apparatus according to a ninth embodiment of the invention in which an imaging device is combined with the lens unit according to the sixth embodiment.

Ninth Embodiment: Imaging Apparatus in which an Imaging Device is Combined with a Lens Unit including Three Lenses (FIG. 14)

In a ninth embodiment, an imaging apparatus is formed by combining an imaging device with the far-infrared lens unit according to the sixth embodiment. A longitudinal sectional view of the entire imaging apparatus according to the ninth embodiment is shown in FIG. 14.

A lens barrel 60, which is formed of metal and has a cylindrical shape, has a male thread strip 62 on a front outer peripheral surface and a male thread portion 63 on a rear outer peripheral surface. An inner peripheral surface is a smooth inner tubular surface 66. The inner tubular surface 66 is a stepped portion 69 protruding in a rear part thereof. A locking protrusion 70 is positioned behind the stepped portion 69. There is a smooth portion 73 in the middle of the outer peripheral portion.

A lens presser 64, which is formed of metal and has a box nut shape, has a female thread portion 65 and a front portion 72 having a slightly small diameter on a front part thereof. The lens barrel 60 and the lens presser 64 can be formed of aluminum, for example.

The first lens G7, the first 67, the second lens G8, and the second spacer 68 are inserted along the inner tubular surface 66 of the lens barrel 60. A rear surface of the third lens G9 is pressed by the locking protrusion 74. The position of the third lens G9 in the axial direction thereof is determined. The second spacer 68 has an approximately cylindrical shape and is inserted between the third lens G9 and the second lens G8 such that the relative position between the second and third lenses G8 and G9 is determined. The first spacer 67 is positioned between the second lens G8 and the first lens G7 such that the relative position between the first and second lenses G7 and G8 is determined. The female thread portion 65 of the lens presser 64 is screwed to the front male thread strip 62 of the lens barrel 60. The lens presser 64 presses the front portion 72 of the first lens G7. The spacers 67 and 68 are formed in a ring shape by using aluminum, ceramics, plastics, and the like.

An imaging device holder 80 having a cylindrical shape has a female thread portion 83 on an inner front side and an opening in the back. A disc-shaped stem 87 is welded to the opening. A cylindrical window holder 84 having an opening is welded to the stem 87. The window W is fixed to the opening of the window holder 84. An imaging device chip 86 is fixed to a middle portion of the stem 87. A front surface of the imaging device chip 86 is the image surface J. The female thread portion 83 is screwed to the female thread portion 63 of the lens barrel 60. In this manner, the imaging apparatus in which the imaging device and the lens unit are integrally formed is obtained.

The embodiments described above are only illustrative at all points and should be considered not to be restrictive. The invention is not limited to the above-described embodiments, but all kinds of changes may be made without departing from the subject matter or spirit of the invention defined by the appended claims and their equivalents.

What is claimed is:

1. A far-infrared camera lens comprising:
   a first lens that has a biconvex shape and is formed of ZnS;
   a second lens that has a negative meniscus or biconcave shape and is formed of ZnS; and
   a third lens that has a positive meniscus shape and is formed of ZnS, wherein
   a diffraction surface is formed in either lens surface of at least one of the first lens, the second lens, or the third lens, and
   a back focus is equal to or larger than 6 mm and equal to or smaller than 20 mm.

2. The far-infrared camera lens according to claim 1, wherein
   a total focal distance f is 10 mm to 30 mm, and
   a focal distance $f_{12}$ of only the first and second lenses is 20 mm to 70 mm.

3. The far-infrared camera lens according to claim 1, wherein
   when the total focal distance of the three lenses is f and the focal distance of only the first and second lenses is $f_{12}$, $1 \leq f_{12}/f \leq 3$.

4. The far-infrared camera lens according to claim 1, wherein
   the first, second, and third lenses formed of ZnS are manufactured by molding ZnS raw powder by heat compression using a lens-shaped mold.

5. The far-infrared camera lens according to claim 1, wherein
   in all of the first, second, and third lenses, sag amount<5 mm, 1.5 mm<central thickness<8 mm, and 1 mm<edge thickness<8 mm.

6. A lens unit using the lens according to claim 1.

7. An imaging apparatus comprising:
   the lens unit according to claim 6; and
   an imaging unit that images an image formed on the lens unit.

8. The far-infrared camera lens according to claim 1, wherein
   the first lens is located at a first distance from an image plane,
   the second lens is located at a second distance from the image plane, the second distance being smaller than the first distance, and
   the third lens is located at a third distance from the image plane, the third distance being smaller than the second distance,
   wherein the back focus is defined between the third lens and the image plane.

* * * * *